(12) United States Patent
Futatsugi et al.

(10) Patent No.: US 9,906,389 B2
(45) Date of Patent: Feb. 27, 2018

(54) RECEIVER, RECEIVING METHOD, AND NON-TRANSITORY COMPUTER READABLE MEDIUM

(71) Applicant: NEC Corporation, Tokyo (JP)

(72) Inventors: Yasunori Futatsugi, Tokyo (JP); Naoto Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/321,624

(22) PCT Filed: Feb. 24, 2015

(86) PCT No.: PCT/JP2015/000904
§ 371 (c)(1),
(2) Date: Dec. 22, 2016

(87) PCT Pub. No.: WO2016/002106
PCT Pub. Date: Jan. 7, 2016

(65) Prior Publication Data
US 2017/0163457 A1    Jun. 8, 2017

(30) Foreign Application Priority Data

Jun. 30, 2014  (JP) ................................ 2014-134112

(51) Int. Cl.
*H04L 27/26*   (2006.01)
*H04B 1/16*    (2006.01)
*H04L 5/00*    (2006.01)

(52) U.S. Cl.
CPC .......... *H04L 27/2607* (2013.01); *H04B 1/16* (2013.01); *H04L 27/2665* (2013.01); *H04L 27/2666* (2013.01); *H04L 5/0007* (2013.01)

(58) Field of Classification Search
CPC ............. H04L 27/2607; H04L 27/2666; H04L 27/2665; H04L 27/2657; H04L 27/2662; H04L 27/2675; H04L 5/0007; H04B 1/16
See application file for complete search history.

(56) References Cited

U.S. PATENT DOCUMENTS

2004/0091057 A1 * 5/2004 Yoshida ............ H04L 25/03146
375/260
2005/0100109 A1   5/2005 Nagata et al.
(Continued)

FOREIGN PATENT DOCUMENTS

EP  1 418 720 A1   5/2004
EP  1 533 968 A2   5/2005
(Continued)

OTHER PUBLICATIONS

International Search Report corresponding to PCT/JP2015/000904, dated May 19, 2015 (5 pages).
(Continued)

*Primary Examiner* — Syed Haider
(74) *Attorney, Agent, or Firm* — Wilmer Cutler Pickering Hale & Dorr

(57) ABSTRACT

The object of the present invention is to reduce the number of complex multiplications in an ICI reduction processing and to reduce the influence of characteristic degradation due to a quantization bit limitation of a digital signal processing. A receiver includes an extended CP addition unit (102) that receives radio signals through a plurality of paths and compensates for a symbol lost within a Fourier transform window to received signals received through the plurality of paths; and FFTs (104-1 and 104-2) each of which performs, in a range of the Fourier transform window, Fourier transform on the received signal with a lost symbol added.

8 Claims, 26 Drawing Sheets

(56) References Cited

U.S. PATENT DOCUMENTS

| | | | | |
|---|---|---|---|---|
| 2006/0172713 A1* | 8/2006 | Suzuki | ............... | H04L 27/2605 |
| | | | | 455/103 |
| 2010/0246730 A1* | 9/2010 | Al-Naffouri | ........ | H04L 25/0238 |
| | | | | 375/341 |
| 2012/0032855 A1* | 2/2012 | Reede | ................... | G01S 5/0289 |
| | | | | 342/458 |

FOREIGN PATENT DOCUMENTS

| | | |
|---|---|---|
| EP | 1 635 494 A1 | 3/2006 |
| JP | 2004-208254 A | 7/2004 |
| JP | 2005-079911 A | 3/2005 |
| JP | 2005-168000 A | 6/2005 |
| JP | 2010-178273 A | 8/2010 |
| WO | WO-2005/002101 A1 | 1/2005 |
| WO | WO-2007/032497 A1 | 3/2007 |

OTHER PUBLICATIONS

Written Opinion corresponding to PCT/JP2015/000904, dated May 19, 2015 (7 pages).

S. Suyama, H. Suzuki, K. Fukawa, "A MIMO-OFDM Receiver Employing the Low-Complexity Turbo Equalization in Multipath Environments with Delay Difference Greater than the Guard Interval," IEICE Trans. Commun., vol. E88-B, No. 1, Jan. 2005 (8 pages).

* cited by examiner

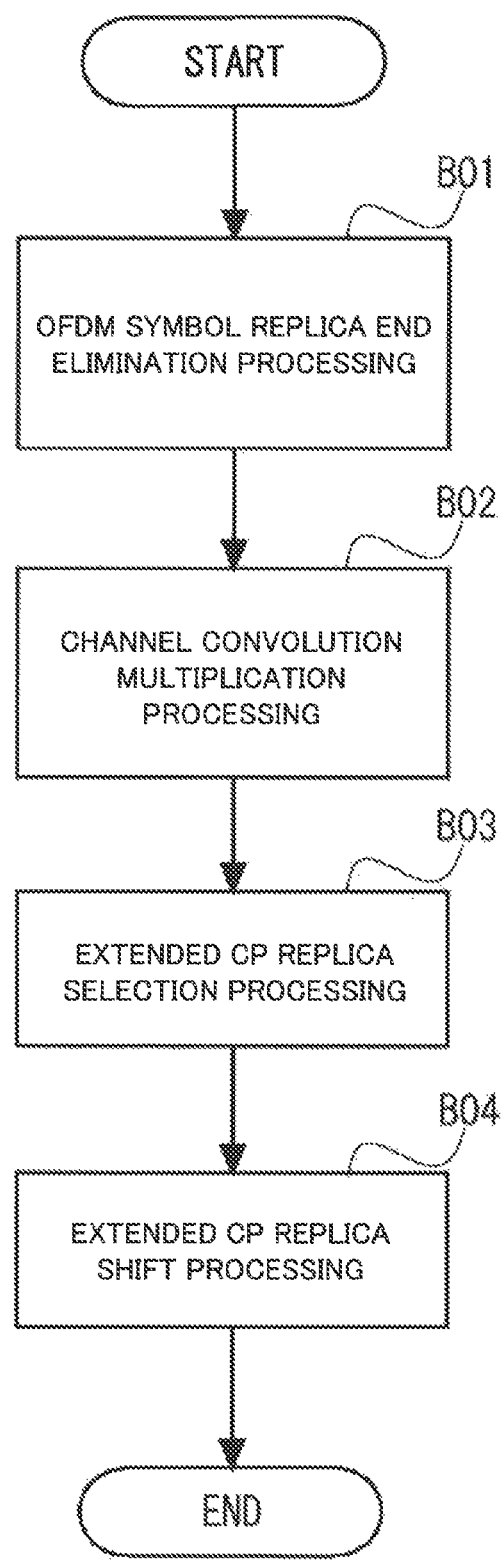

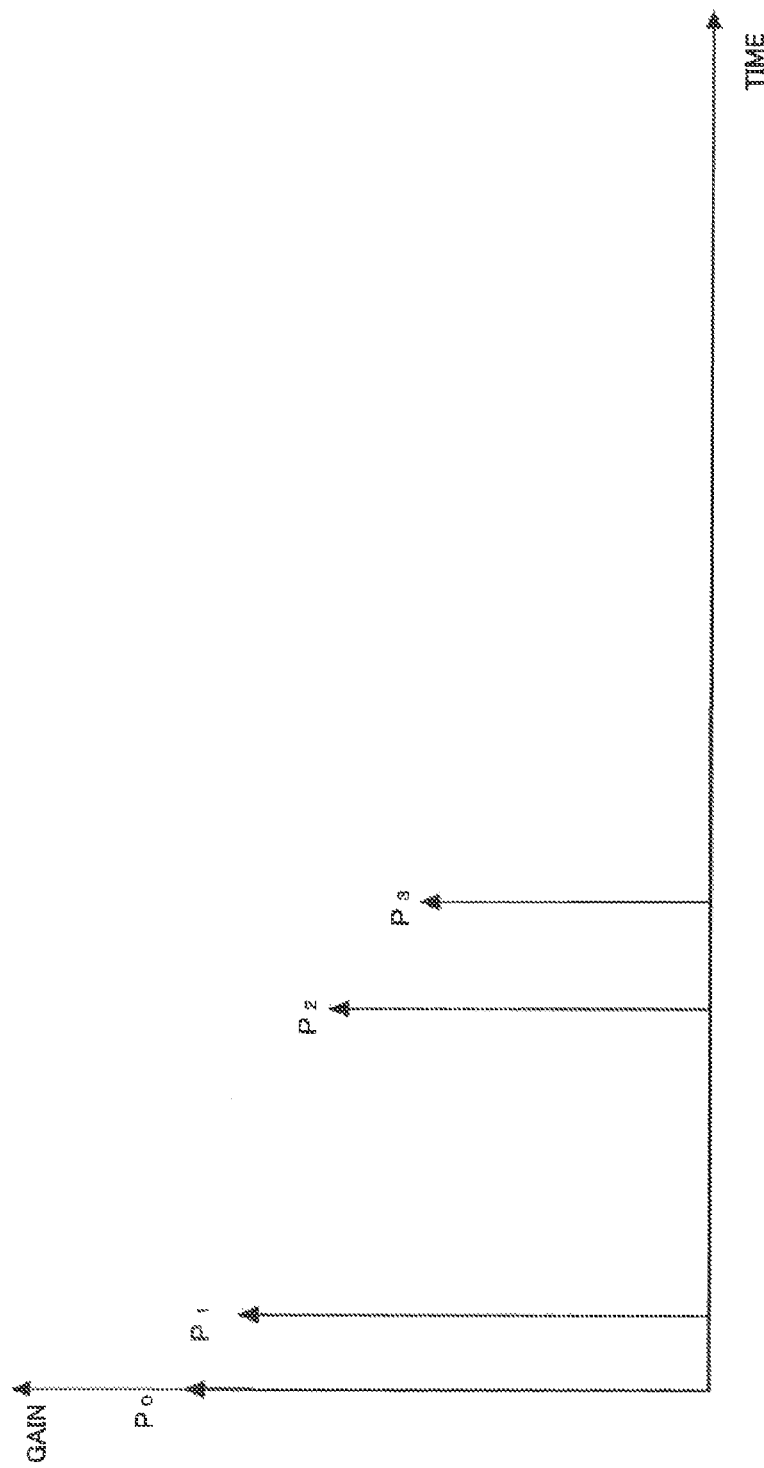

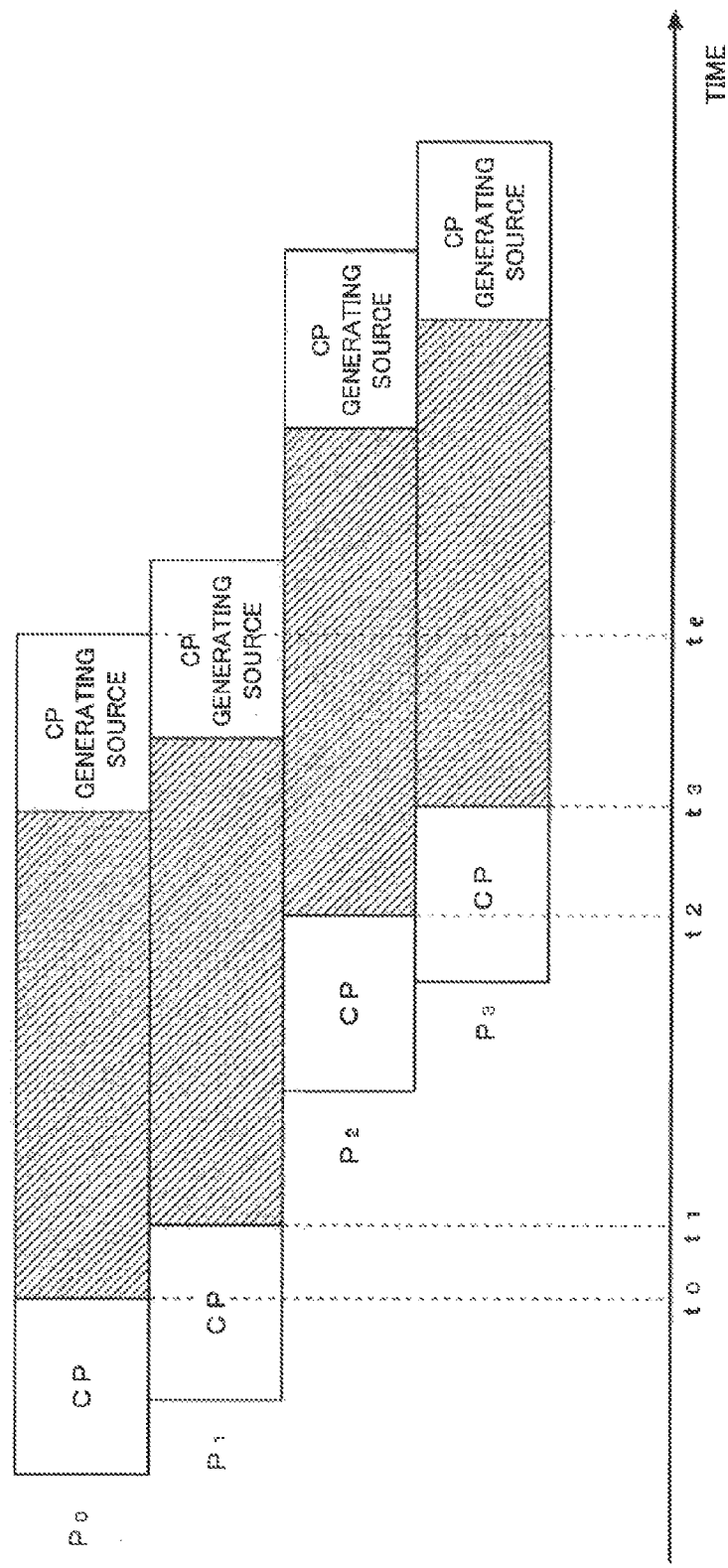

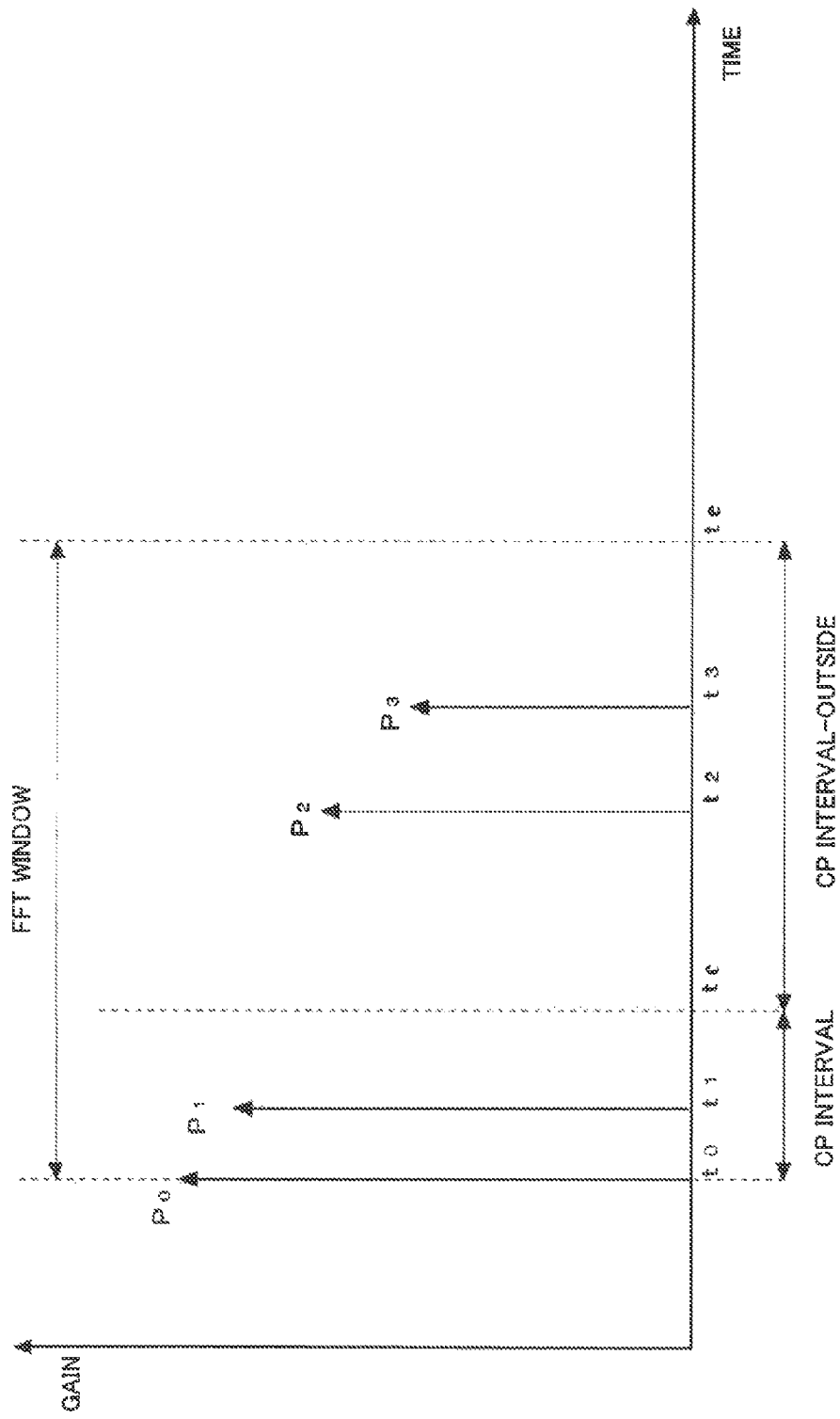

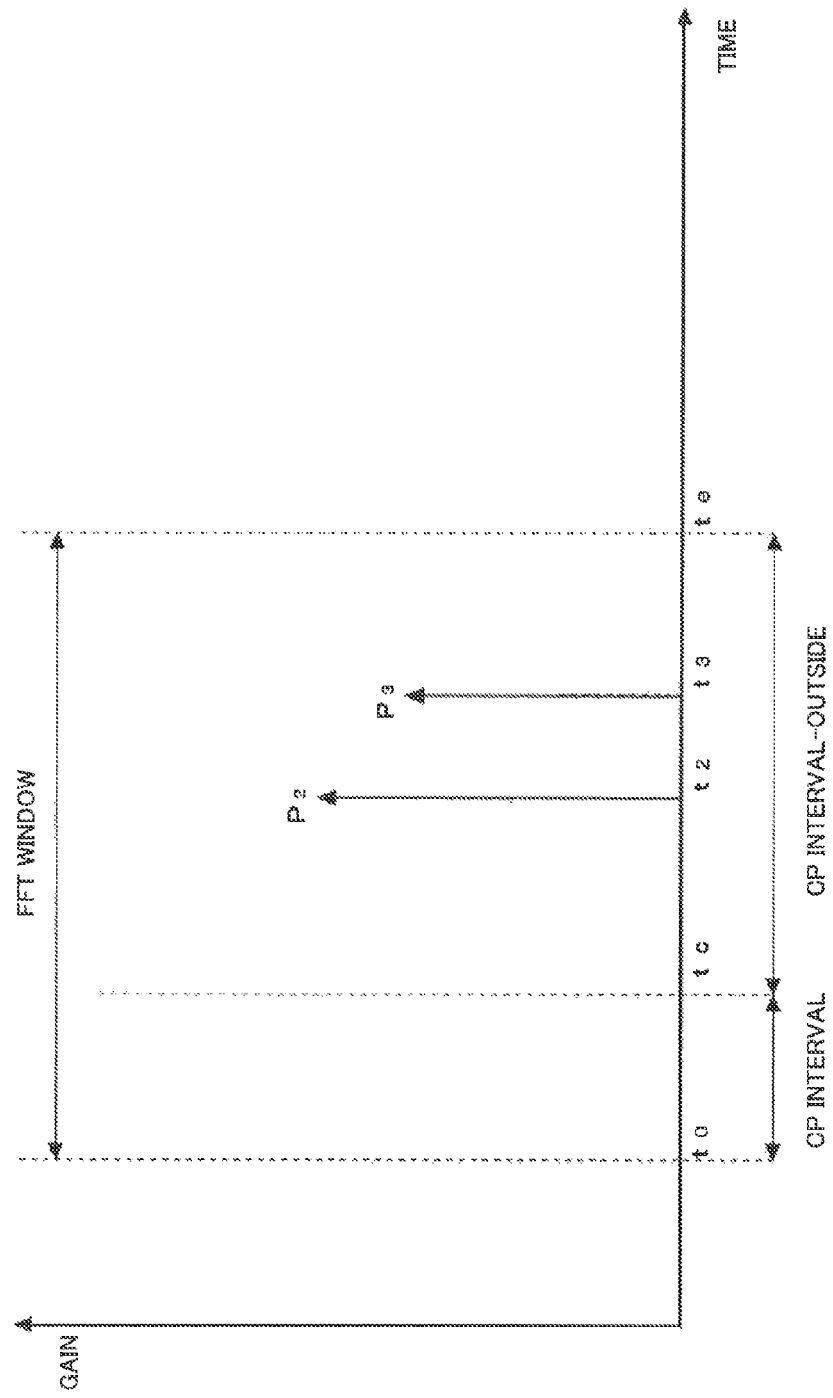

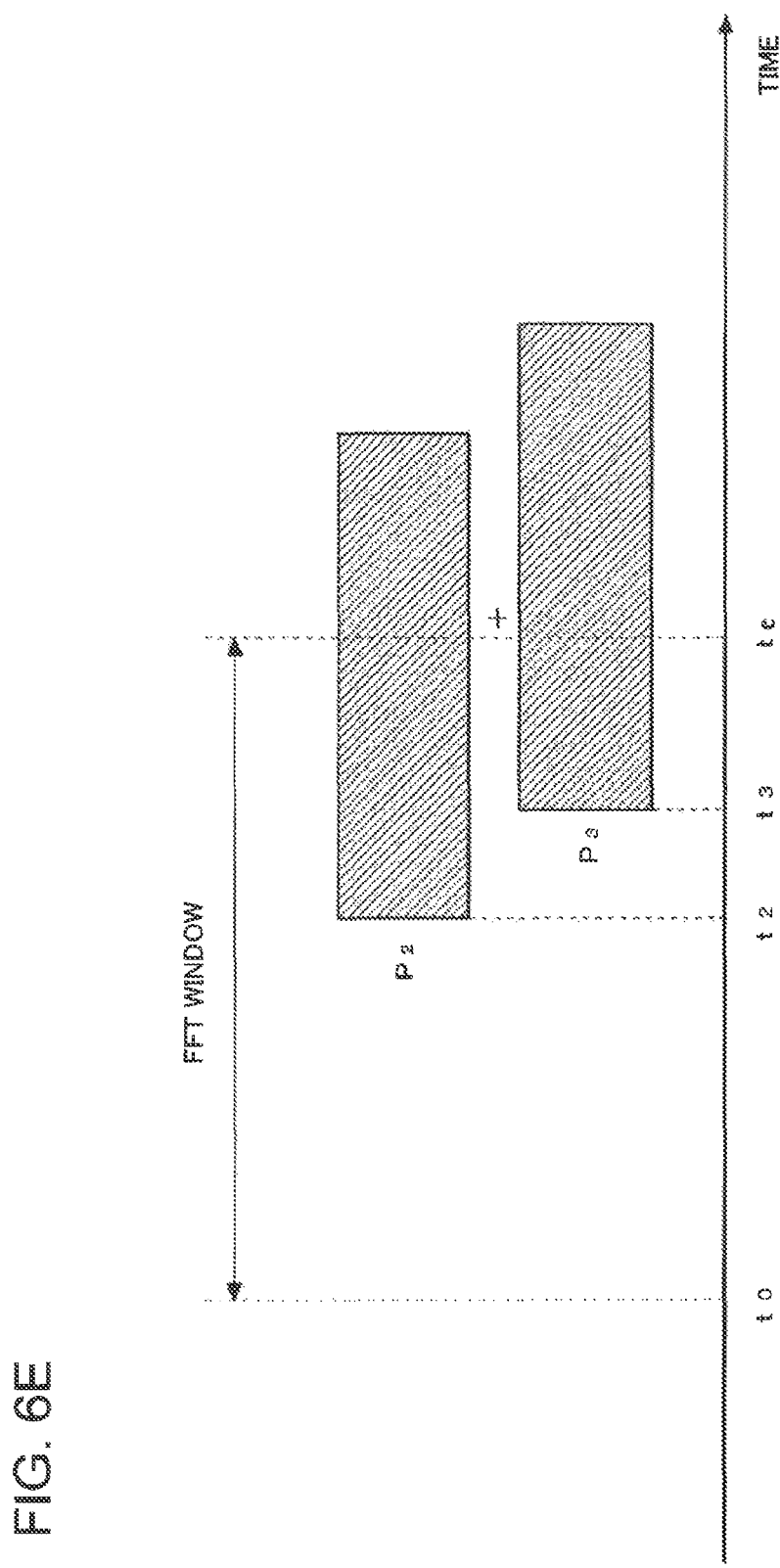

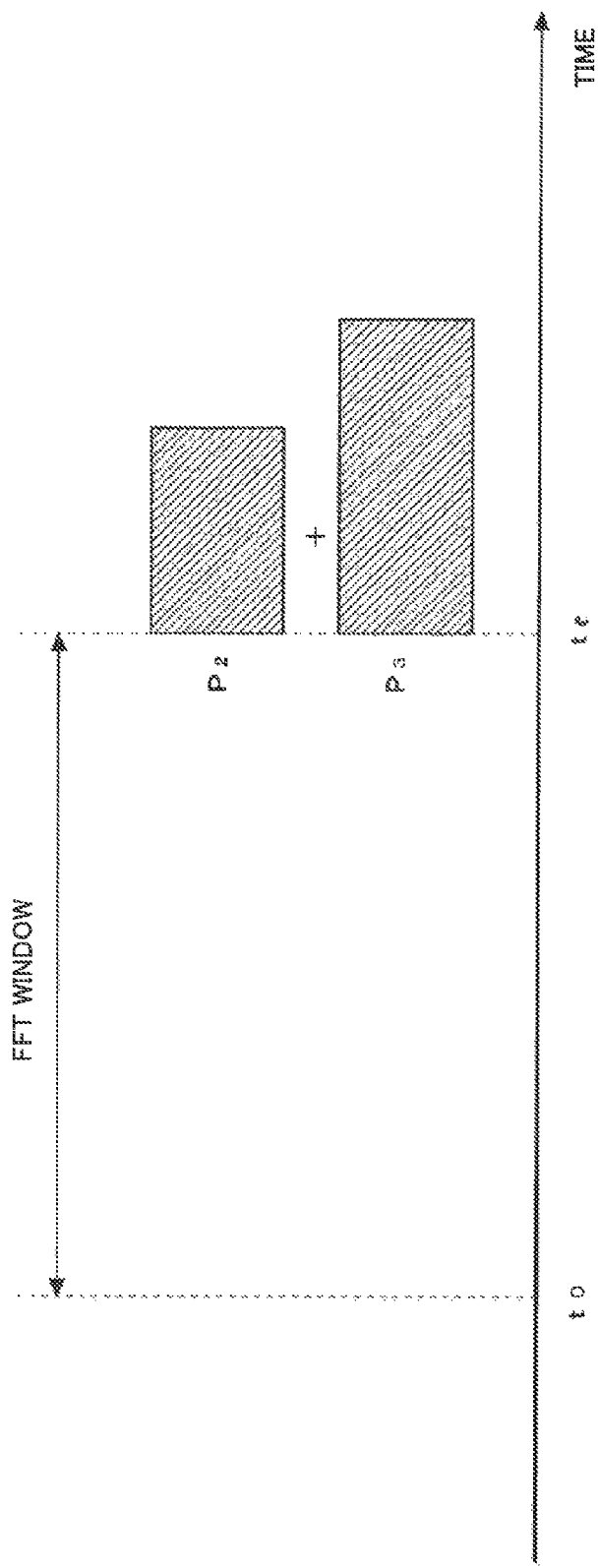

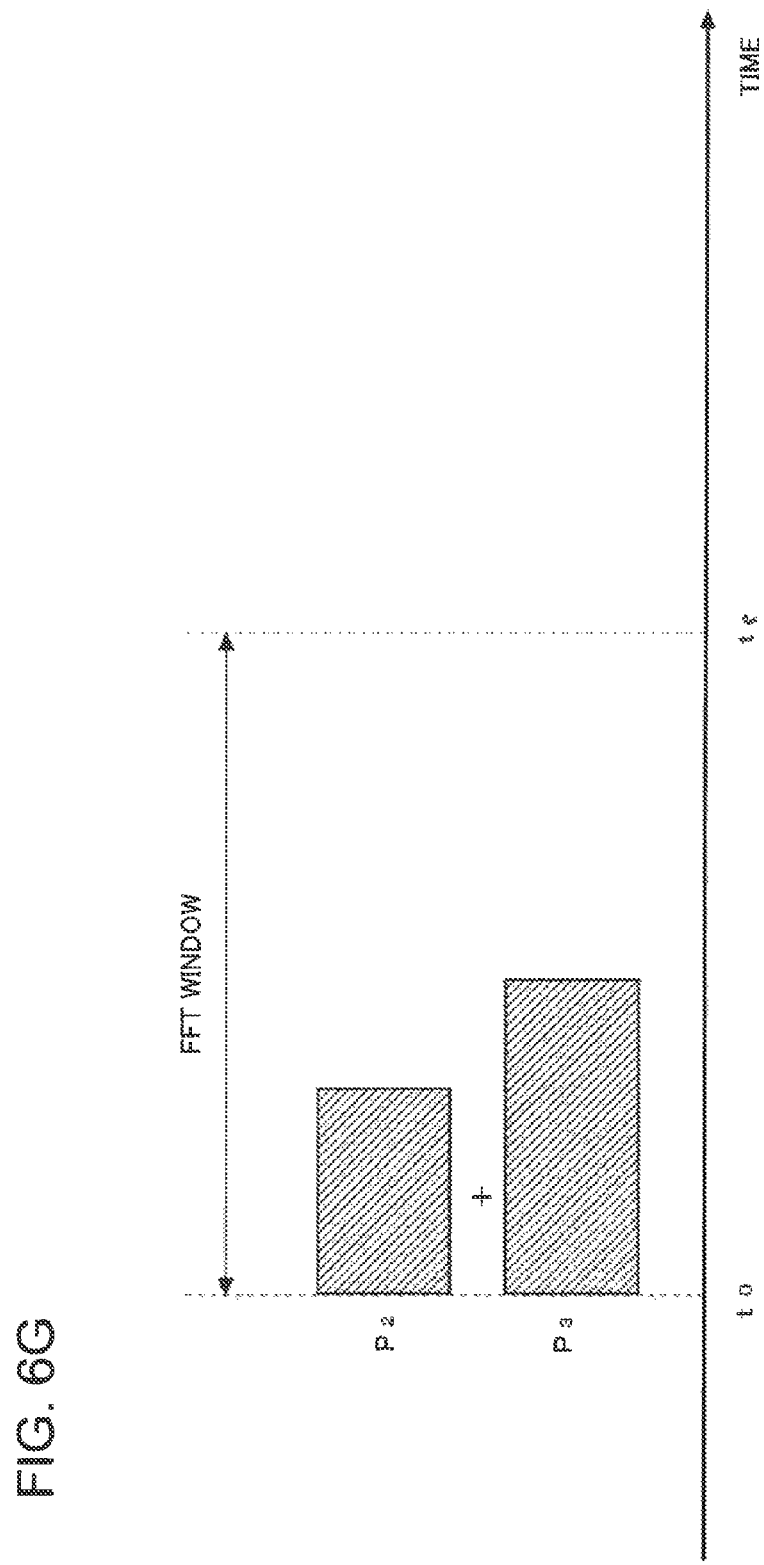

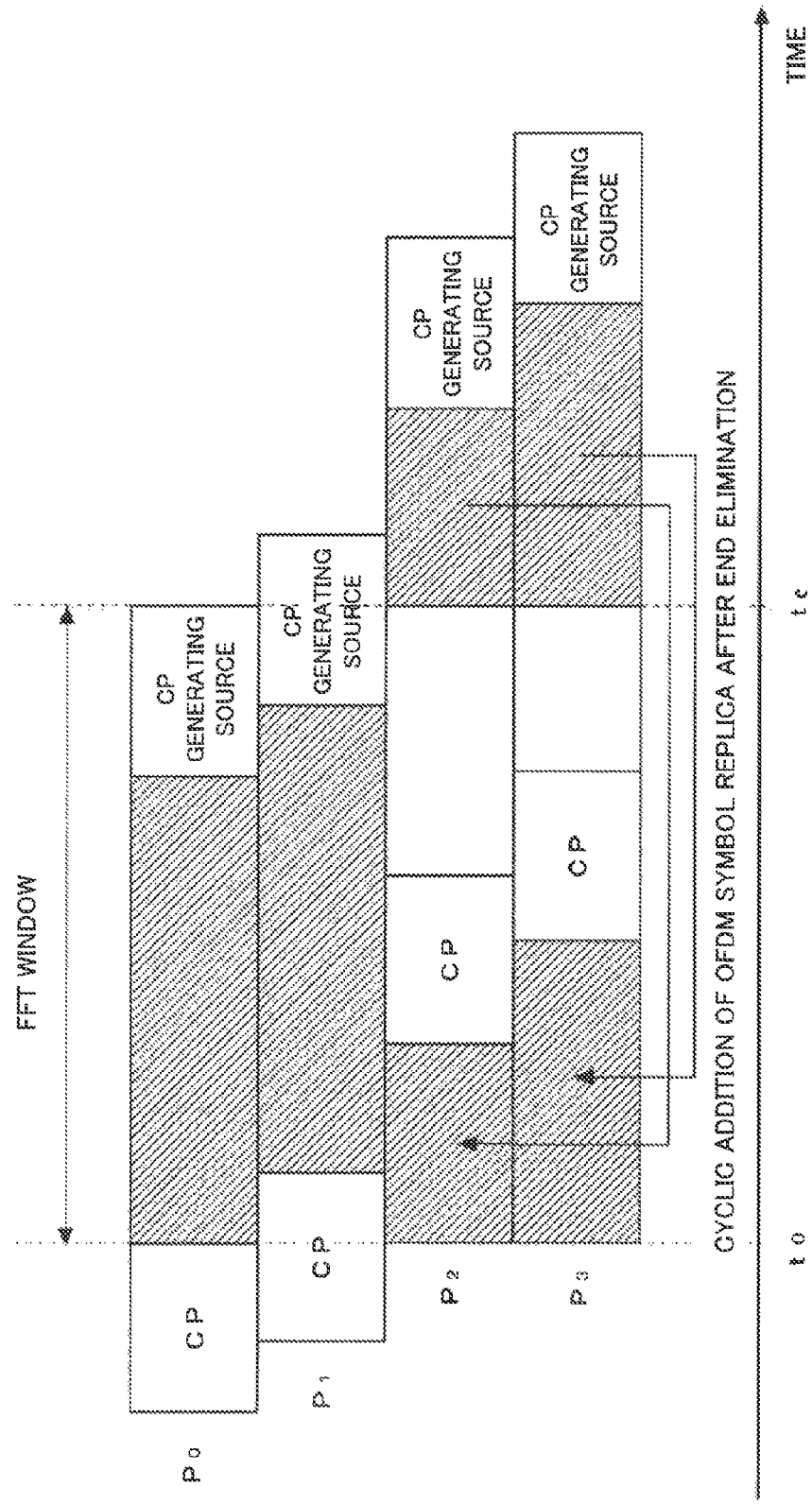

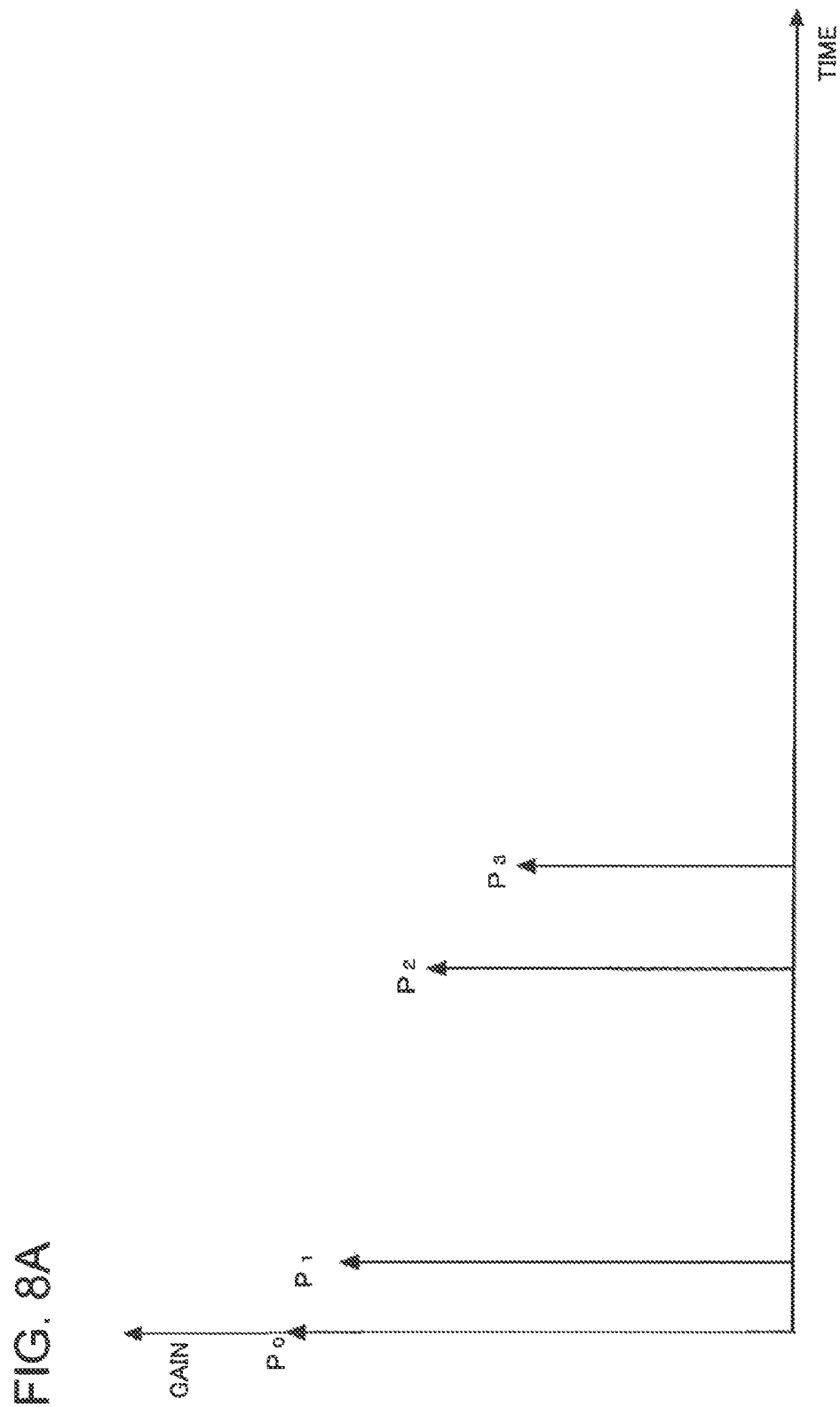

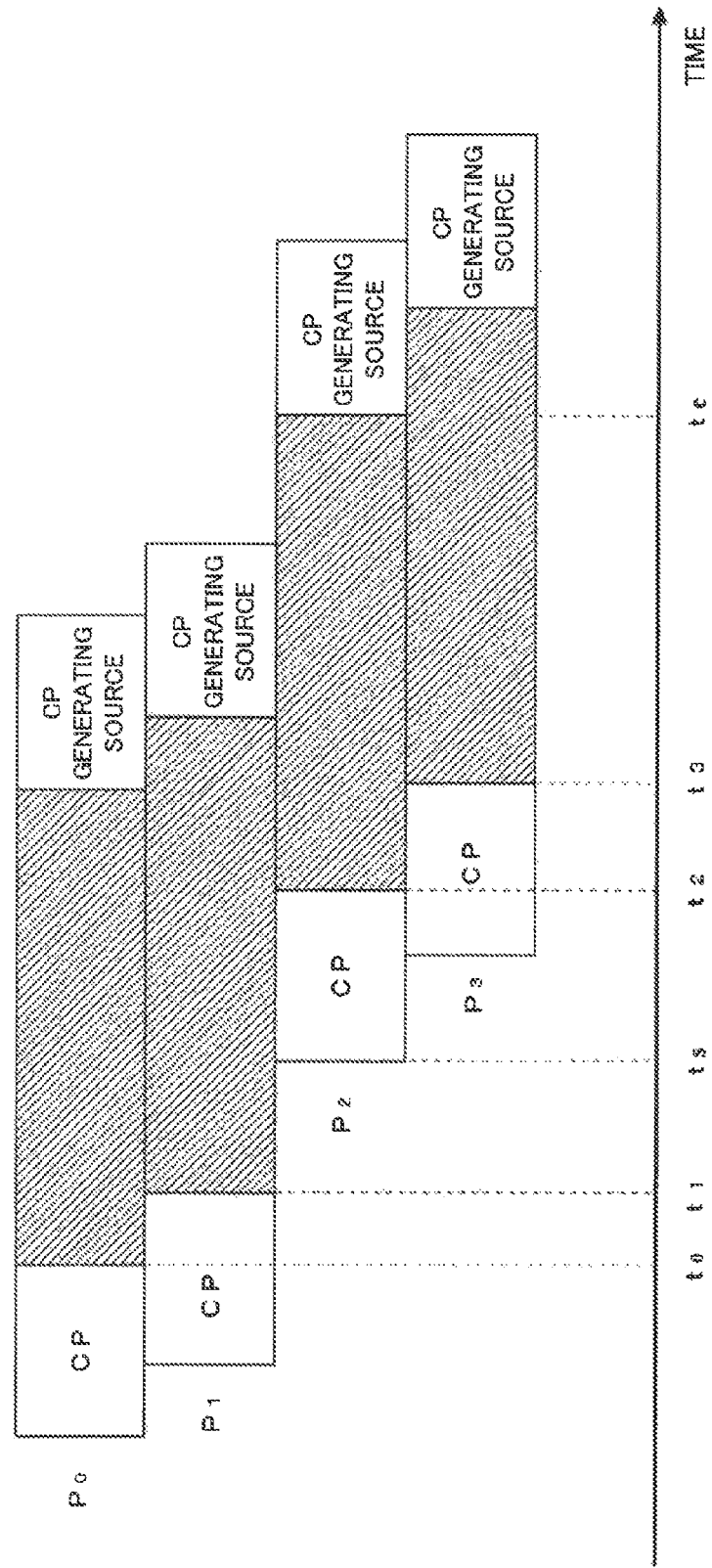

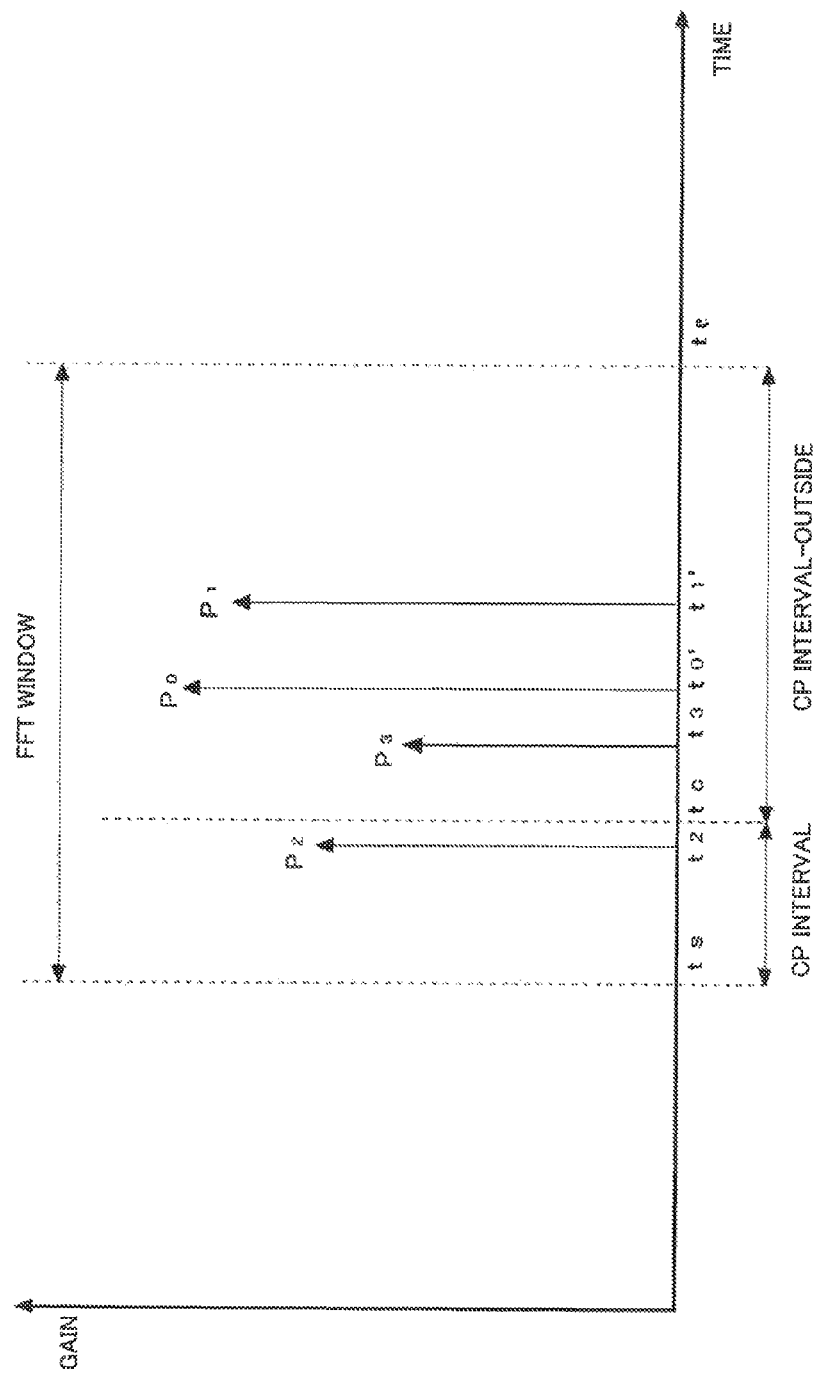

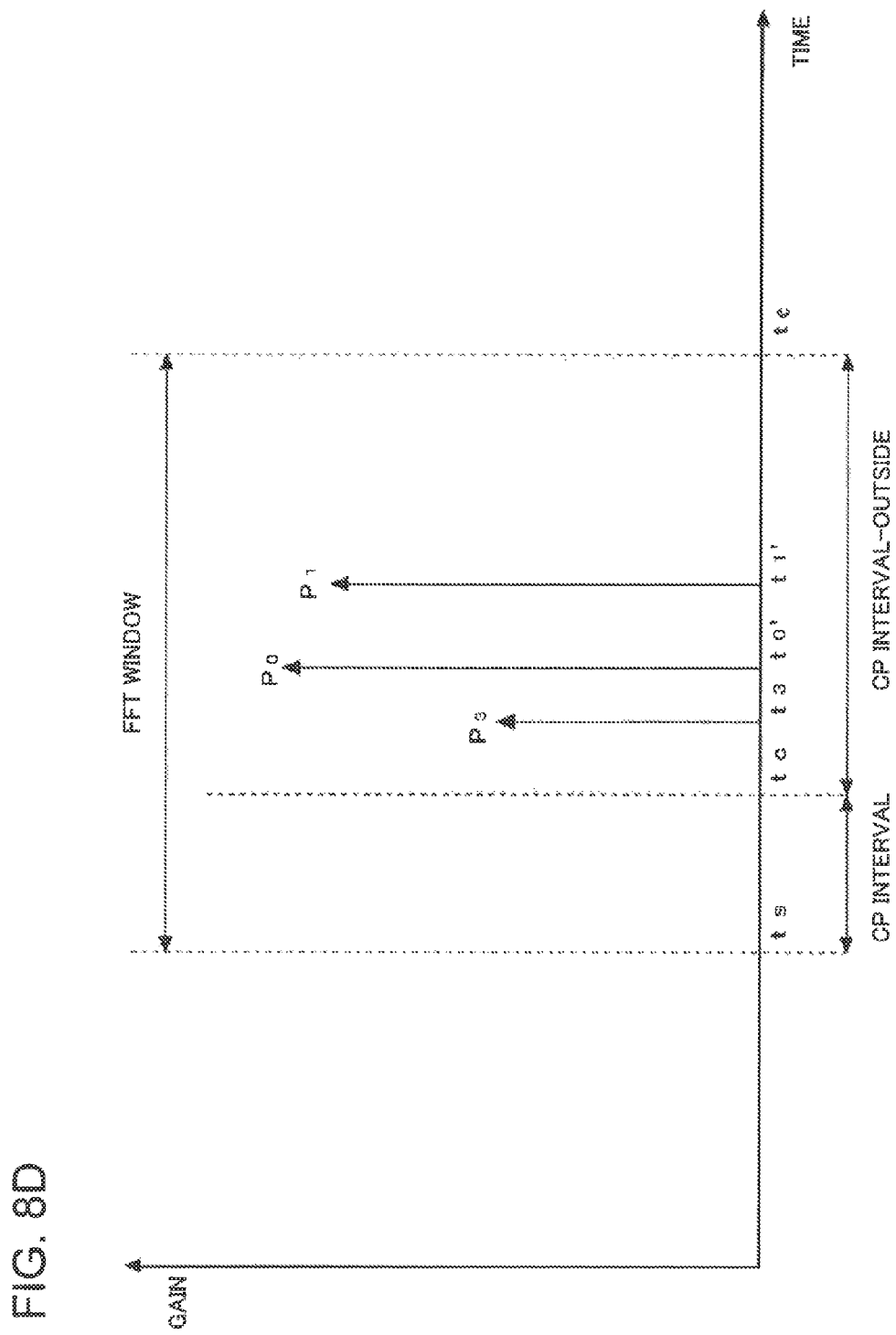

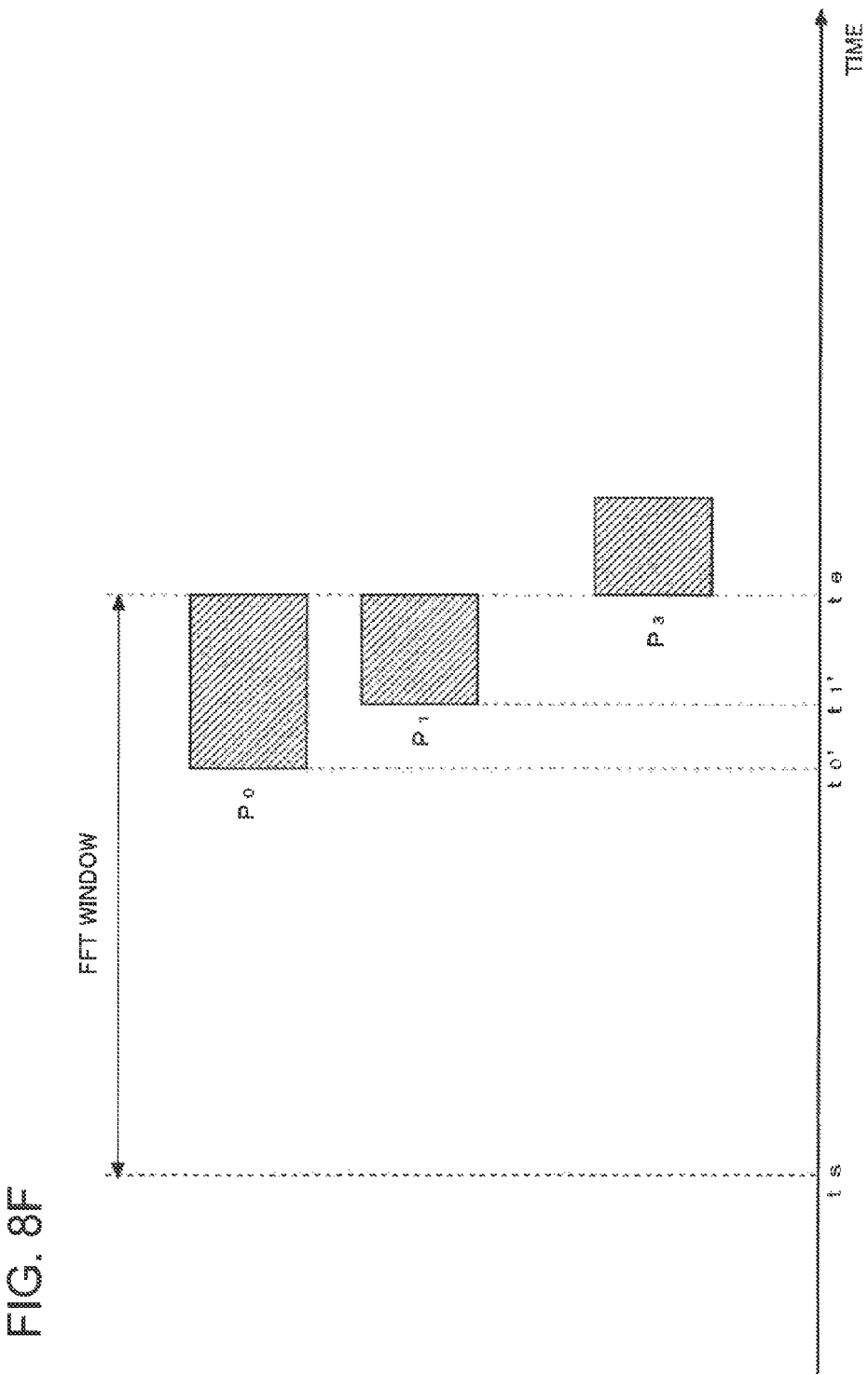

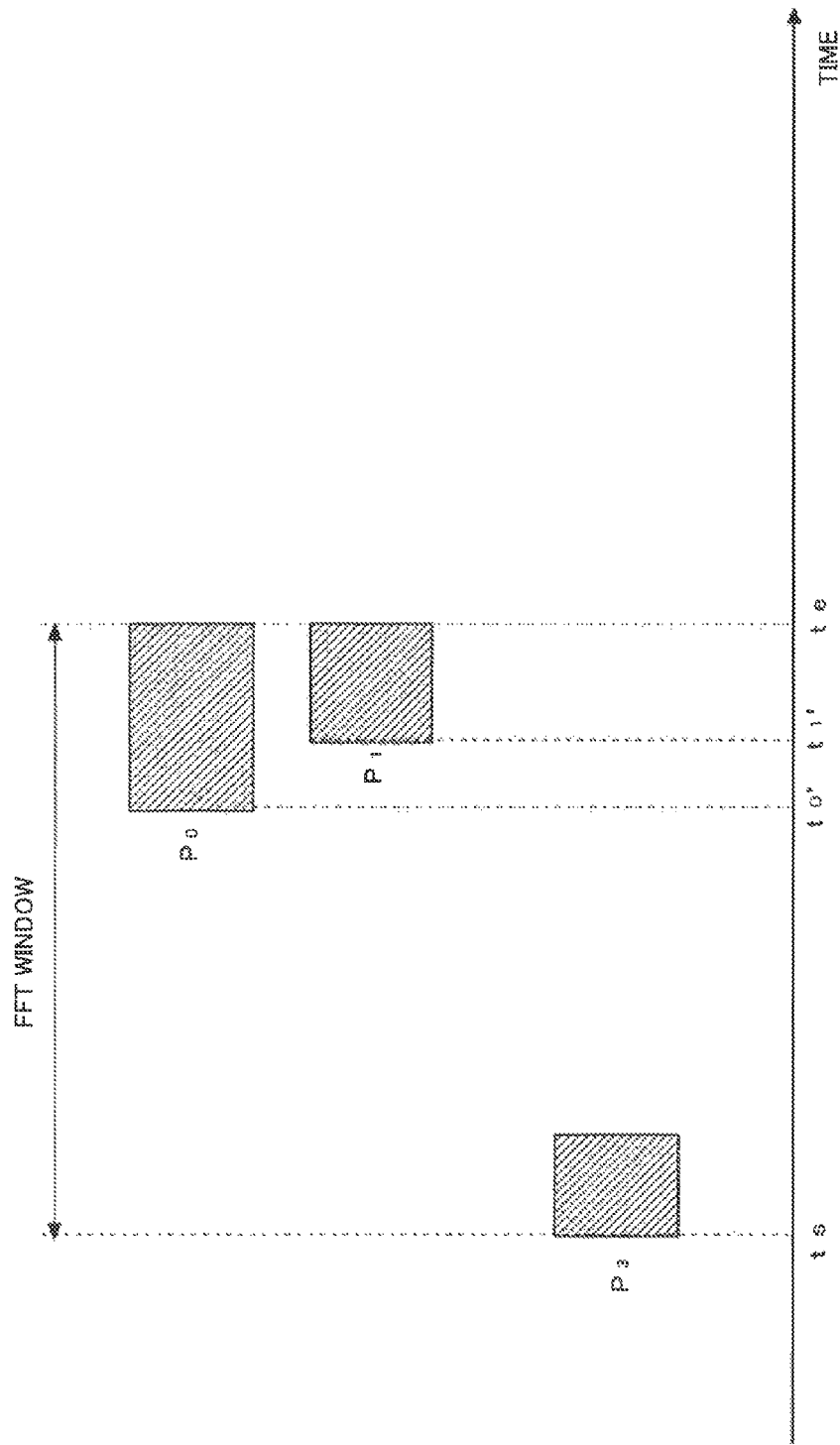

RECEIVER, RECEIVING METHOD, AND NON-TRANSITORY COMPUTER READABLE MEDIUM

CROSS-REFERENCE TO RELATED APPLICATIONS

This application is a national stage application of International Application No. PCT/JP2015/000904 entitled "RECEIVER, RECEIVING METHOD, AND NON-TRANSITORY COMPUTER READABLE MEDIUM" filed on Feb. 24, 2015, which claims the benefit of the priority of Japanese Patent Application No. 2014-134112, filed on Jun. 30, 2014, the disclosures of each of which are hereby incorporated by reference in their entirety.

TECHNICAL FIELD

The present invention relates to receivers, receiving methods, and non-transitory computer readable media, and relates to, for example, an OFDM receiver, an OFDM receiving method, and a non-transitory computer readable medium storing an OFDM receiving program.

BACKGROUND ART

Over recent years, in various types of radio communication systems, an OFDM (Orthogonal Frequency Division Multiplexing) technique has been employed. The OFDM technique can increase a symbol length by parallel transmission using a plurality of carrier waves, and therefore it is possible to equalize received signals using a simple receiver configuration even in a multipath communication line having frequency selectivity.

In general, in the OFDM technique, a CP (Cyclic Prefix) is provided between OFDM symbols in order to handle a delay in a multipath communication line. FIG. 10 is a schematic diagram illustrating CP addition processing on a transmitting side. On the transmitting side, an OFDM symbol 601 is generated by IFFT (Inverse Fast Fourier Transform). Then, on the transmitting side, an end 602 of the OFDM symbol 601 is copied to generate a CP 603, and the generated CP 603 is added right in front of the OFDM symbol 601.

Usually, a CP length is designed taking into account a spread of delay between multipath communication lines. However, if the spread of delay exceeds the CP length, anterior and posterior OFDM symbols in the time direction interfere with each other, which causes OFDM ISI (Inter Symbol Interference) and ICI (Inter Carrier Interference) in which subcarriers in the frequency direction interfere with each other, which results in receiving characteristic degradation.

The ISI is an interference that is caused by the fact that OFDM symbols disposed before and behind an OFDM symbol subjected to FFT (Fast Fourier Transform) on a receiving side exceed a CP length and then leak into an FFT window. On the other hand, the ICI is an interference between subcarriers that is caused by the fact that a communication path matrix is not diagonalized in FFT because a communication path matrix becomes a non-circulant matrix because a spread of delay exceeds a CP length.

As techniques to solve the above-described problem, receivers disclosed in PTL 1, PTL 2, PTL 3, and NPL 1 are known. For example, in NPL 1, under the environment where there is a spread of delay exceeding a card interval corresponding to a CP length, an ISI replica and an ICI replica are generated using a signal after decoding, and then the ISI replica and the ICI replica are subtracted from a received signal.

FIG. 11 is a diagram illustrating an example of conventional receivers. Specifically, FIG. 11 is a simplified block diagram to illustrate the receiver disclosed in NPL 1. The receiver disclosed in NPL 1 of FIG. 11 includes an ISI elimination unit 701, an ICI elimination unit 702, an optimum detection filtering unit 703, a decoding unit 704, a symbol replica generating unit 705, an ISI replica generating unit 706, and an ICI replica generating unit 707. Hereinafter, configurations of the ICI replica generating unit 707 and the ICI elimination unit 702 that relate to ICI reduction processing will be described.

The ICI replica generating unit 707 generates an ICI replica using a symbol replica generated in the symbol replica generating unit 705 and a channel estimation value of an impulse response from a transmission path between a transmitter and a receiver. Specifically, the ICI replica generating unit 707 calculates an ICI channel matrix by performing matrix multiplication for a non-circulant matrix of a communication path matrix generated from the channel estimation value and a Fourier transform matrix. Next, ICI replica is generated by multiplying the ICI channel matrix and a symbol replica vector together. The ICI replica generating unit 707 outputs the ICI replica to the ICI elimination unit 702.

The ICI elimination unit 702 subtracts the ICI replica from a received signal obtained by eliminating the ISI in the ISI elimination unit 701. The ICI elimination unit 702 outputs the received signal having been subtracted to the optimum detection filtering unit 703. The optimum detection filtering unit 703 executes FFT processing and channel equalization at the same time.

As described above, in ICI elimination processing of the receiver disclosed in NPL 1, an ICI replica is calculated for each subcarrier on a frequency axis, and the ICI replica is subtracted from a received signal.

CITATION LIST

Patent Literature

[PTL 1] Japanese Patent Application Laid-open Publication No. 2010-178273
[PTL 2] International Publication No. WO2007/032497
[PTL 3] Japanese Patent Application Laid-open Publication No. 2005-79911

Non Patent Literature

[NPL 1] S. Suyama, H. Suzuki, K. Fukawa, "A MIMO-OFDM Receiver Employing the Low-Complexity Turbo Equalization in Multipath Environments with Delay Difference Greater than the Guard Interval," IEICE Trans. Commun., vol. E88-B, no. 1, January 2005.

SUMMARY OF INVENTION

Technical Problem

In the technique disclosed in NPL 1, it is necessary to matrix-multiply a communication path matrix of a non-circulant matrix and a Fourier transform matrix together in the ICI replica generating unit 707; consequently, the complexity of a receiver increases due to a lot of complex multiplication calculations. Specifically, according to the technique disclosed in NPL 1, if an FFT point number is represented by N, a rough estimation of the number of complex multiplication calculations necessary for ICI reduction is expressed in formula (1), and the number of complex multiplication calculations increases substantially as the FFT point number increases.

$$O(N^3+N^2) \quad (1)$$

Because a signal dynamic range of an ICI channel matrix is large, there is fear that characteristics are degraded due to a quantization bit limitation of digital signal processing.

The object of the present invention is to provide a receiver, a receiving method, and a receiving program that reduce the number of calculations in Fourier transform for a radio received signal and reduce receiving characteristic degradation due to a delay equal to or larger than a CP length.

Solution to Problem

A receiver according to an exemplary aspect of the present invention includes an adding means for compensating for a symbol lost within a Fourier transform window to received signals received through a plurality of paths; and a Fourier transform means for performing, in a range of the Fourier transform window, Fourier transform on a received signal with a lost symbol added in the addition means.

A receiving method according to an exemplary aspect of the present invention includes an adding step for compensating for a symbol lost within a Fourier transform window to received signals received through a plurality of paths; and a Fourier transform step for performing, in a range of the Fourier transform window, Fourier transform on a received signal with a lost symbol added in the addition step.

A non-transitory computer readable medium according to an exemplary aspect of the present invention, the receiving program comprising: an adding step for compensating for a symbol lost within a Fourier transform window to received signals received through a plurality of paths; and a Fourier transform step for performing, in a range of the Fourier transform window, Fourier transform on a received signal with a lost symbol added in the addition step, and outputting a signal after transform.

Advantageous Effects of Invention

According to the present invention, it is possible to reduce the number of calculations in Fourier transform for a radio received signal and reduce receiving characteristic degradation due to a delay equal to or larger than a CP length.

BRIEF DESCRIPTION OF DRAWINGS

FIG. 5 is a flowchart illustrating extended CP replica generation processing in accordance with the first exemplary embodiment of the present invention.

FIG. 6A is a schematic diagram illustrating an example of signals received through multipaths in the first exemplary embodiment of the present invention.

FIG. 6B is a schematic diagram illustrating an example of OFDM symbols of the signals received through the multipaths in the first exemplary embodiment of the present invention.

FIG. 6C is a schematic diagram illustrating an example of channel estimation values of the signals received through the multipaths in the first exemplary embodiment of the present invention.

FIG. 6D is a schematic diagram illustrating an example of CP interval-outside channel estimation values selected by a CP interval-outside selection unit 111 in the first exemplary embodiment of the present invention.

FIG. 6E is a schematic diagram illustrating an example of signals after being subjected to convolution multiplication by a channel convolution multiplying unit 202 in the first exemplary embodiment of the present invention.

FIG. 6F is a schematic diagram illustrating an example of extended CP replica signals selected by an extended replica CP selection unit 203 in the first exemplary embodiment of the present invention.

FIG. 6G is a schematic diagram illustrating an example of signals shifted by an extended CP replica shift unit 204 in the first exemplary embodiment of the present invention.

FIG. 6H is a diagram illustrating an example of signals obtained by compensating for a defective component in received OFDM symbols within an FFT window, in the first exemplary embodiment of the present invention.

FIG. 8A is a schematic diagram illustrating an example of signals received through multipaths in the second exemplary embodiment of the present invention.

FIG. 8B is a schematic diagram illustrating an example of OFDM symbols of the signals received through the multipaths in the second exemplary embodiment of the present invention.

FIG. 8C is a schematic diagram illustrating an example of channel estimation values of the signals received through the multipaths in the second exemplary embodiment of the present invention.

FIG. 8D is a schematic diagram illustrating an example of CP interval-outside channel estimation values selected by a CP interval-outside selection unit 111 in the second exemplary embodiment of the present invention.

FIG. 8F is a schematic diagram illustrating an example of signals selected as extended CP replicas in the second exemplary embodiment of the present invention.

FIG. 8G is a schematic diagram illustrating an example of signals shifted by an extended CP replica shift unit 403 in the second exemplary embodiment of the present invention.

FIG. 8I is a diagram illustrating an example of signals obtained by compensating for a defective component in received OFDM symbols within an FFT window, in the second exemplary embodiment of the present invention.

DESCRIPTION OF EMBODIMENTS

A First Exemplary Embodiment of the Present Invention

In a first exemplary embodiment of the present invention, under the environment where a spread of delay in a multipath communication line exceeds a CP length, demodulation is performed reducing an influence of ISI and ICI. As an example, in the first exemplary embodiment of the present invention, a case will be described in which OFDM is used as a transmission scheme and two receiving antennas are used.

Figure 1:
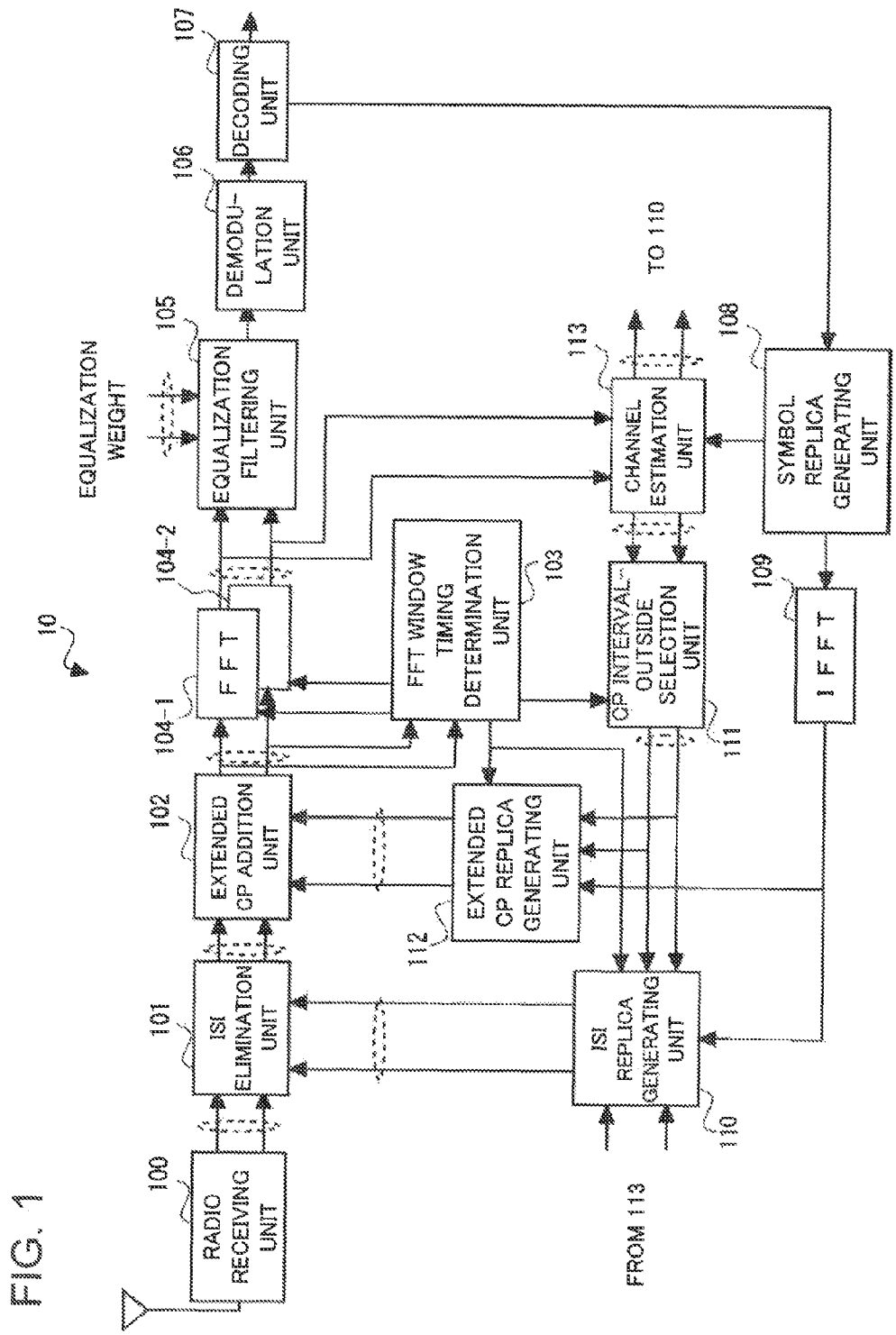
FIG. 1 is a block diagram illustrating a configuration of a receiver in accordance with a first exemplary embodiment of the present invention.

FIG. 1 is a block diagram illustrating a configuration of a receiver in accordance with the first exemplary embodiment of the present invention. In FIG. 1, a receiver 10 includes a radio receiving unit 100, an ISI elimination unit 101, an extended CP addition unit 102, an FFT window timing determination unit 103, FFTs 104-1 and 104-2, an equalization filtering unit 105, a demodulation unit 106, a decoding unit 107, a symbol replica generating unit 108, an IFFT 109, an ISI replica generating unit 110, a CP interval-outside selection unit 111, an extended CP replica generating unit 112, and a channel estimation unit 113.

The radio receiving unit 100 performs, on received signal received through the antenna, respective processings for conversion to a baseband (base frequency band) frequency, lowpass filtering, AGC (Auto Gain Control), and A/D (Analog-to-Digital) conversion. The radio receiving unit 100 outputs received signals after the processing to the ISI elimination unit 101.

The ISI elimination unit 101 eliminates ISI from the received signals using an ISI replica output from the ISI replica generating unit 110. Specifically, the ISI elimination unit 101 subtracts the ISI replica from the received signals and outputs received signals after the subtraction to the extended CP addition unit 102.

The extended CP addition unit 102 compensates for a symbol lost within a Fourier transform window to received signals received through a plurality of paths. Specifically, the extended CP addition unit 102 compensates for a symbol lost within a Fourier transform window to received signals after ISI elimination using an extended CP replica output from the extended CP replica generating unit 112. Specifically, the extended CP addition unit 102 adds the extended CP replica to the received signals after ISI elimination and outputs resultant signals to the FFTs 104-1 and 104-2. At a first equalization, since an ISI replica and an extended CP replica are not generated, an ISI replica and an extended CP replica may be initialized and set at zero.

The FFT window timing determination unit 103 determines a timing for FFT processing referring to the received signal to which the extended CP is added in the extended CP addition unit 102. The FFT window timing determination unit 103 outputs the information on the determined timing for FFT processing, to the FFTs 104-1 and 104-2, the ISI replica generating unit 110, the CP interval-outside selection unit 111, and the extended CP replica generating unit 112. The timing for FFT processing can be determined by an autocorrelation technique using a CP of an OFDM symbol in the received signals or by a cross-correlation technique using a known reference signal.

The FFTs 104-1 and 104-2 perform the fast Fourier transform on the received signal after the extended CP added output from the extended CP addition unit 102 at the timing within the FFT window that is output from the FFT window timing determination unit 103. Specifically, the FFTs 104-1 and 104-2 perform the fast Fourier transform processing in which a head timing of the FFT window is set at a starting position for each receiving antenna. The FFTs 104-1 and 104-2 output the received signals after the transform to the equalization filtering unit 105. DFT (Discrete Fourier Transform) may be used instead of the FFT.

The equalization filtering unit 105 equalizes the received signals after the FFT output from the FFTs 104-1 and 104-2. Specifically, the equalization filtering unit 105 causes synthesis of the signals after the FFT for each receiving antenna according to an equalization weight and obtains equalized signals after the receiving antenna synthesis. The equalization filtering unit 105 outputs the equalized signal after the receiving antenna synthesis to the demodulation unit 106. As the equalization weight, an equalization weight by which a received signal power to noise power ratio (SNR) is maximized may be used, for example. As a calculation method for the equalization weight, any of various types of methods described in prior art documents is applicable.

The demodulation unit 106 converts the equalized signal after the receiving antenna synthesis into soft decision information for each bit. The demodulation unit 106 outputs the soft decision information to the decoding unit 107.

The decoding unit 107 performs error correction decoding on the soft decision information output from the demodulation unit 106. The decoding unit 107 outputs the soft decision information after the error correction with enhanced reliability to the symbol replica generating unit 108. The convolution decoding or the turbo decoding is used for the error correction decoding, for example. The decoding unit 107 may output binary information, which is hard decision information, instead of the soft decision information. In this case, it is preferable for the decoding unit 107 to preform, together with the error correction decoding, a binary decision on the soft decision information using a predetermined threshold.

The symbol replica generating unit 108 converts the soft decision information after the decoding output from the decoding unit 107 into a soft symbol replica. The symbol replica generating unit 108 outputs the soft symbol replica to the IFFT 109.

For the soft symbol replica, QPSK (Quadrature Phase Shift Keying), 16QAM (16 Quadrature Amplitude Modulation), or 64QAM (64 Quadrature Amplitude Modulation) is used, for example. As a method for converting the soft decision information into the soft symbol replica, various types of methods described in prior art documents are applicable. The symbol replica generating unit 108 outputs a hard symbol replica to the IFFT 109 instead of the soft symbol replica if the binary information, which is the hard decision information, is inputted from the decoding unit 107.

The IFFT 109 generates an OFDM symbol replica by performing the inverse fast Fourier transform processing on the soft symbol replica (or the hard symbol replica) output from the symbol replica generating unit 108. The IFFT 109 outputs the OFDM symbol replica to the ISI replica generating unit 110 and the extended CP replica generating unit 112. IDFT (Inverse Discrete Fourier Transform) may be used instead of IFFT.

The ISI replica generating unit 110 generates an ISI replica using the OFDM symbol replica output from the IFFT 109, the FFT window timing output from the FFT window timing determination unit 103, and a channel estimation value of an impulse response of a communication path between a transmitter and a receiver. Specifically, the ISI replica generating unit 110 convolution-multiplies the OFDM symbol replica and the channel estimation value together, and generates the ISI replica based on the FFT window timing. The ISI replica generating unit 110 outputs the ISI replica to the ISI elimination unit 101. As to a method for generating the ISI replica, the ISI replica can be generated by the method disclosed in NPL 1, for example.

The CP interval-outside selection unit 111 selects a channel estimation value outside an interval corresponding to the CP length of a head within the FFT window from among channel estimation values output from the channel estimation unit 113 based on the FFT window timing output from the FFT window timing determination unit 103. The CP interval-outside selection unit 111 outputs the selected channel estimation value, that is, the channel estimation value outside an interval corresponding to the CP length of a head within the FFT window, to the extended CP replica generating unit 112.

The extended CP replica generating unit 112 generates an extended CP replica by using the OFDM symbol replica output from the IFFT 109 and the CP interval-outside channel estimation value output from the CP interval-outside selection unit 111 based on the FFT window timing output from the FFT window timing determination unit 103. The extended CP replica generating unit 112 outputs the extended CP replica to the extended CP addition unit 102.

The extended CP replica is a signal corresponding to a defective component of a self-OFDM symbol in an FFT window by multipaths. Adding the extended CP replica to a received signal makes a communication path matrix a circulant matrix, and makes it possible to reduce ICI that occurs after the FFT. A detailed configuration of the extended CP replica generating unit 112 will be described below with reference to FIG. 2.

The channel estimation unit 113 calculates a channel estimation value using a reference signal in received signals and a reference signal replica. The channel estimation unit 113 outputs the channel estimation value to the ISI replica generating unit 110 and the CP interval-outside selection unit 111. The channel estimation value can be calculated by the cross-correlation processing of a known reference signal replica and a receiving reference signal, for example. As the reference signal replica, a replica corresponding to a reference signal generated in the symbol replica generating unit may be used. The reference signal is a reference signal that is Fourier-transformed in each of the FFTs 104-1 and 104-2.

As mentioned above, in the first exemplary embodiment of the present invention, an extended CP replica is generated as a signal corresponding to a defective component of a self-OFDM symbol within an FFT window by multipath, and the extended CP replica is added to a received signal.

Figure 2:
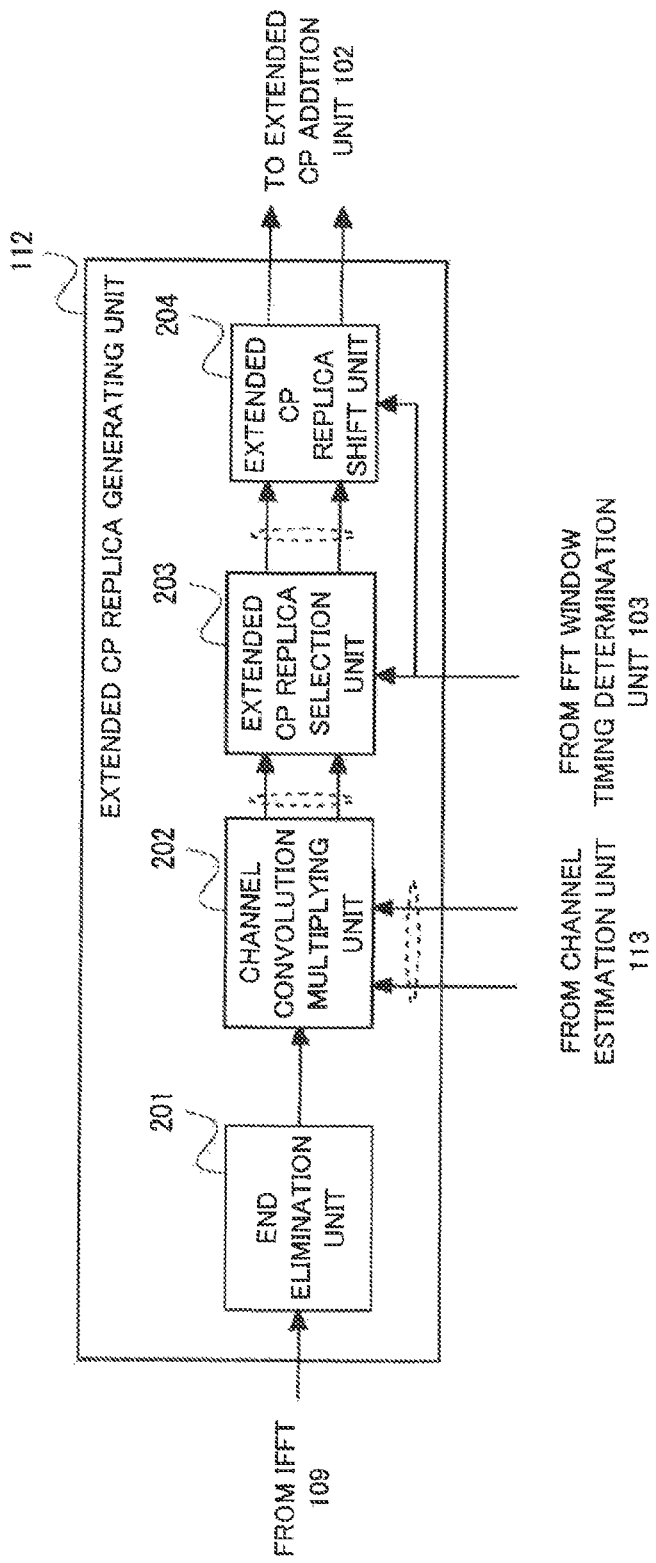
FIG. 2 is a block diagram illustrating a configuration of an extended CP replica generating unit in accordance with the first exemplary embodiment of the present invention.

Next, detailed configurations to generate the extended CP replica will be described. FIG. 2 is a block diagram illustrating a configuration of the extended CP replica generating unit in accordance with the first exemplary embodiment of the present invention. The configuration of the extended CP replica generating unit 112 illustrated in FIG. 2 is an example suitable for a case in which a path head timing, indicating a head of OFDM symbols before adding CP in every path, is located later than an FFT window timing. In FIG. 2, the extended CP replica generating unit 112 includes an end elimination unit 201, a channel convolution multiplying unit 202, an extended CP replica selection unit 203, and an extended CP replica shift unit 204.

The end elimination unit 201 eliminates an end interval corresponding to a CP length in the OFDM symbol replica output from the IFFT 109 in FIG. 1. The end elimination unit 201 outputs the OFDM symbol replica with the end interval eliminated to the channel convolution multiplying unit 202.

Figure 3:
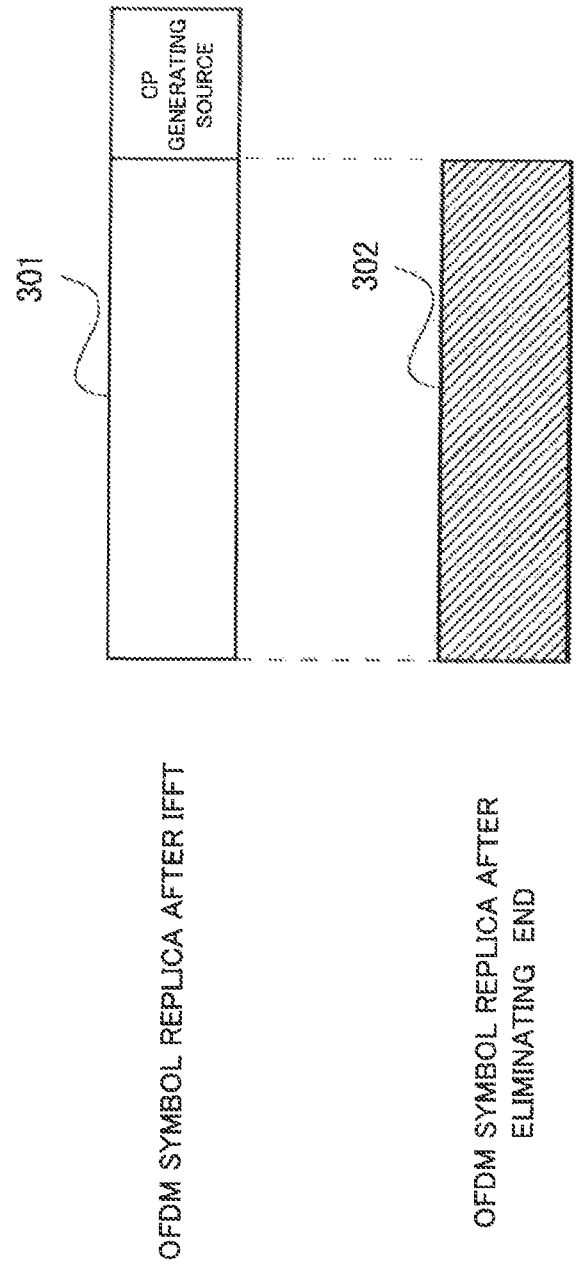
FIG. 3 is a schematic diagram illustrating OFDM symbol replica processing in the first exemplary embodiment of the present invention.

FIG. 3 illustrates the processing for the OFDM symbol replica in the end elimination unit 201. FIG. 3 is a schematic diagram illustrating the OFDM symbol replica processing in the first exemplary embodiment of the present invention. The end elimination unit 201 eliminates an end interval corresponding to a CP length in an OFDM symbol replica 301 output from the IFFT 109 and generates an OFDM symbol replica 302 with the end eliminated.

Returning to FIG. 2, the configuration of the extended CP replica generating unit will be described. The channel convolution multiplying unit 202 convolution-multiplies the OFDM symbol replica with the end eliminated in the end elimination unit 201 by a CP interval-outside channel estimation value output from the CP interval-outside selection unit 111. The channel convolution multiplying unit 202 outputs a signal after convolution-multiplying to the extended CP replica selection unit 203.

The extended CP replica selection unit 203 selects a signal outside an interval of the FFT window from the signal convolution-multiplied in the channel convolution multiplying unit 202 using an FFT window timing from the FFT window timing determination unit 103 in FIG. 1. The extended CP replica selection unit 203 outputs the selected signal outside the interval of the FFT window to the extended CP replica shift unit 204.

The extended CP replica shift unit 204 generates an extended CP replica by shifting, to a head timing in the FFT window, a signal after the CP interval-outside channel estimation value convolution-multiplication that is located outside the interval behind the FFT window in the signal after the CP interval-outside channel estimation value convolution-multiplication that is located outside the FFT window interval. The extended CP replica shift unit 204 outputs the extended CP replica to the extended CP addition unit 102.

Since the transmitting technique based on OFDM is a block transmitting technique based on FFT, the end signal and the head signal of the OFDM are continuous. So the extended CP replica shift unit 204 cyclic-shifts a signal after the CP interval-outside channel estimation value convolution-multiplication in the same OFDM symbol so that a received signal after adding the extended CP replica may not be lost within the FFT window.

Figure 4:
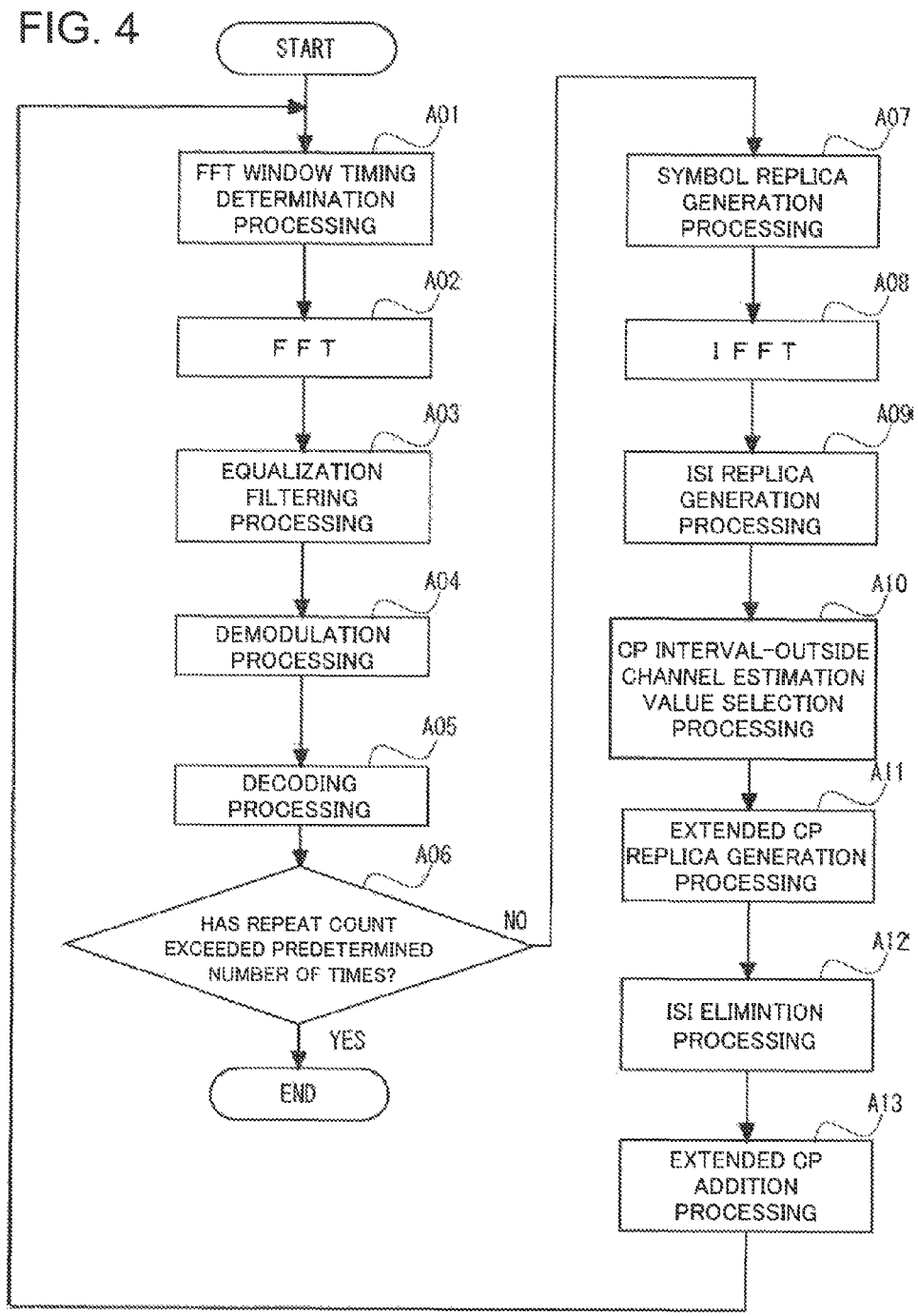
FIG. 4 is a flowchart illustrating receiving process in accordance with the first exemplary embodiment of the present invention.

Next, processing steps for the receiver of the first exemplary embodiment will be described. FIG. 4 is a flowchart illustrating receiving process in accordance with the first exemplary embodiment of the present invention. Specifically, FIG. 4 is a flowchart illustrating an operation example of ISI elimination, extended CP addition, and demodulation in the receiver of the first exemplary embodiment. The flowchart of FIG. 4 includes steps A01 to A13.

The FFT window timing determination unit 103 determines an FFT window timing referring to received signals, and the processing moves to step A02 (step A01).

The FFTs 104-1 and 104-2 perform FFT processing on the received signals based on the FFT window timing, and the processing moves to step A03 (step A02).

The equalization filtering unit 105 performs a receiving antenna synthesis by multiplying the received signals FFT-processed and equalization weights together, and the processing moves to step A04 (step A03).

The demodulation unit 106 generates soft decision information for each bit from the equalized signal subjected to equalization weight multiplication processing, and the processing moves to step A05 (step A04).

The decoding unit 107 generates soft decision information after the error correction by performing error correction decoding processing on the soft decision information, and the processing moves to step A06 (step A05).

In step A06, it is determined whether the number of repetition processing from step A01 to step A13 exceeds a predetermined number of times, and the processing moves to step A07 if the repeat count does not exceed the predetermined number of times. If the repeat count has exceeded the predetermined number of times, the processing is completed. When a CRC (Cyclic Redundancy Check) is added to a transmitting signal, the hard decision results of the soft decision information after decoding are subjected to a cyclic redundancy check. If the CRC result is no good, the processing moves to step A07, and the processing may be terminated if the CRC result is OK.

The symbol replica generating unit 108 generates a soft symbol replica from the soft decision information after the error correction, and the processing moves to step A08 (step A07).

The IFFT 109 generates an OFDM symbol replica by performing IFFT processing on the soft symbol replica, and the processing moves to step A09 (step A08).

The ISI replica generating unit 110 generates an ISI replica from the soft symbol replica and a channel estimation value based on the FFT window timing, and the processing moves to step A10 (step A09).

The CP interval-outside selection unit 111 selects a channel estimation value outside the CP interval of the head within the FFT window from among channel estimation values, and the processing moves to step A11 (step A10). If the channel estimation value is updated for each repetition processing, the CP interval-outside channel estimation value may be updated by performing step A10 for each repetition processing. On the other hand, if the channel estimation value is not updated for each repetition processing, it is acceptable to perform step A10 at a first equalization processing and move to step A11 skipping step A10 after the first repetition.

The extended CP replica generating unit 112 generates an extended CP replica from the soft symbol replica and the CP interval-outside channel estimation value based on the FFT window timing, and the processing moves to step A12 (step A11).

The ISI elimination unit 101 subtracts the ISI replica from the received signal, and the processing moves to step A13 (step A12).

The extended CP addition unit 102 adds the extended CP replica to the received signal, and the processing moves to step A01 (step A13).

Next, a detailed operation of the extended CP replica generation processing will be described. FIG. 5 is a flowchart illustrating the extended CP replica generation processing in accordance with the first exemplary embodiment of the present invention. Specifically, FIG. 5 is a flowchart illustrating a detailed operation example of the extended CP replica generation processing (step A11) in FIG. 4. The flowchart in FIG. 5 includes steps B01 to B04.

The end elimination unit 201 eliminates an end interval corresponding to the CP length in the OFDM symbol replica, and the processing moves to step B02 (step B01).

The channel convolution multiplying unit 202 convolution-multiplies the OFDM symbol replica with the end eliminated and a CP interval-outside channel estimation value together, and the processing moves to step B03 (step S02).

The extended CP replica selection unit 203 selects an interval-outside component of the FFT window in a signal after CP interval-outside channel estimation value convolution multiplication, and the processing moves to step B04 (step B03).

The extended CP replica shift unit 204 generates an extended CP replica by shifting a signal after selection of the interval-outside component of the FFT window and (step B04).

Next, using FIG. 6A to FIG. 6H, the signal processing according to the first exemplary embodiment will be described. FIG. 6A to FIG. 6H illustrate a series of processing details to generate an extended CP replica from an OFDM symbol replica in the CP interval-outside selection unit 111 and the extended CP replica generating unit 112 included in the receiver described in FIG. 1. Specifically, FIG. 6A to FIG. 6H illustrate images of signal processing results in a case where a path head timing indicating a head of an OFDM symbol before CP addition is located later than an FFT window timing.

FIG. 6A is a schematic diagram illustrating an example of the signals received through multipath. FIG. 6B is a schematic diagram illustrating an example of OFDM symbols of the signals received through multipath. FIG. 6C is a schematic diagram illustrating an example of channel estimation values of the signals received through multipath. FIG. 6D is a schematic diagram illustrating an example of CP interval-outside channel estimation values selected by the CP interval-outside selection unit 111. FIG. 6E is a schematic diagram illustrating an example of the signals convolution-multiplied by the channel convolution multiplying unit 202. FIG. 6F is a schematic diagram illustrating an example of the extended CP replica signals selected by the extended replica CP selection unit 203. FIG. 6G is a schematic diagram illustrating an example of the signals shifted by the extended CP replica shift unit 204. FIG. 6H is a diagram illustrating an example of the signals obtained by compensating for defective components in received OFDM symbols within an FFT window.

In FIG. 6A, paths $P_0$, $P_1$, $P_2$, and $P_3$ represent signals that are received at different timings due to delay difference resulting from different communication paths. In FIG. 6A, the vertical axis represents a gain and the horizontal axis represents a time difference of the signals received through each path. Each path is expressed as a timing at a head of each CP and a gain.

FIG. 6B illustrates the relation between received OFDM symbols having passed through a multipath communication line composed of the paths $P_0$, $P_1$, $P_2$, and $P_3$ and path head timings of the respective paths. As with FIG. 6A, in each of FIG. 6B to FIG. 6H, the horizontal axis represents a time difference of the signals received through each path. In each of FIG. 6B to FIG. 6H, a reference $t_0$ represents a timing of the head of a symbol except a CP through the path $P_0$. In a similar way, $t_1$ represents a timing of the head of a symbol except a CP through the path $P_1$, $t_2$ represents a timing of the head of a symbol except a CP through the path $P_2$, and $t_3$ represents a timing of the head of a symbol except a CP through the path $P_3$. The tail end of the symbol including a CP generating source through the path $P_0$ is represented by $t_e$.

In FIG. 6C and FIG. 6D, the vertical axis represents a gain and the horizontal axis represents a time difference of the signals received through each path. Each channel estimation value is expressed as a timing of the head of a symbol through each path and a gain. As illustrated in FIG. 6C, an FFT window ranges from $t_0$ to $t_e$. The FFTs 104-1 and 104-2 perform Fourier transform on symbols of a plurality of paths by the FFT window unit.

In the present invention, the processing is performed before Fourier transform, of cyclic-shifting an own symbol replica and adding the resulting replica to the signal, for a signal of a path whose timing differs from a reference for a processing timing equal to or larger than a CP length. Specifically, in the invention of the first exemplary embodiment, the processing is performed before Fourier transform, of cyclic-shifting an own symbol replica and adding the resulting replica to the signal, for a received signal of a path with a delay more than the CP length.

The CP interval-outside selection unit 111 selects channel estimation values composed of the paths $P_2$ and $P_3$ departing from the CP interval of the head within the FFT window from among channel estimation values composed of the paths $P_0$, $P_1$, $P_2$, and $P_3$. That is to say, in FIG. 6C, the paths $P_0$ and $P_1$ included in the paths $P_0$, $P_1$, $P_2$, and $P_3$, which are located at the timing ranging from a head timing $t_0$ of the symbol through the first head path $P_0$ to $t_c$ that is a timing behind $t_0$ by the CP length, are paths each of which has a delay equal to or smaller than the CP length. On the other hand, the paths that are positioned at timings behind $t_c$ are paths each of which has a delay larger than the CP length.

Since the FFT window ranges from $t_0$ to $t_e$, the CP interval-outside selection unit 111 selects paths positioned at the timing period from $t_c$ to $t_e$ as paths each of which has a delay larger than the CP length. In FIG. 6C, the paths $P_2$ and $P_3$ are the paths that are positioned at the timing period from $t_c$ to $t_e$, that is, the paths each of which has a delay larger than the CP length. Consequently, the CP interval-outside selection unit 111 selects the channel estimation values of the paths $P_2$ and $P_3$ as CP interval-outside channel estimation values. FIG. 6D illustrates an example of the selected CP interval-outside channel estimation values.

The channel convolution multiplying unit 202 convolution-multiplies an OFDM symbol replica with an end corresponding to the CP length eliminated and a CP interval-outside channel estimation value, and generates a signal after the CP interval-outside channel estimation value convolution-multiplication. A signal corresponding to a path received with a delay longer than the CP length is generated by multiplying the OFDM symbol replica by the CP interval-outside channel estimation value. FIG. 6E is a diagram illustrating signals after convolution-multiplying an OFDM symbol replica by a CP interval-outside channel estimation value, that is, signals after CP interval-outside channel estimation value convolution-multiplication.

In the first exemplary embodiment, a portion that cannot be compensated for using a CP due to a delay is made up for in OFDM symbols of the signals received through multipath. That is to say, the extended CP replica selection unit 203 selects an interval-outside component of an FFT window from among the signals after CP interval-outside channel estimation value convolution-multiplication, and generates a signal after extended CP replica selection. It is described using FIG. 6E to select the signals that are positioned behind $t_e$ of the tail end of the FFT window. FIG. 6F is a diagram illustrating an example of signals after the selection.

The extended CP replica shift unit 204 shifts an interval-outside component behind the FFT window to the head within the FFT window and generates an extended CP replica. FIG. 6G is a diagram illustrating an example of extended CP replica signals after the shift. That is to say, the extended CP replica signal is cyclic-shifted within the FFT window. Specifically, in FIG. 6G, the extended CP replica signals of the paths $P_2$ and $P_3$ are shifted to a timing of $t_0$. The extended CP addition unit 102 adds the cyclic-shifted extended CP replica signal to the received OFDM symbol. The results from the addition are illustrated in FIG. 6H.

FIG. 6H is a diagram illustrating an example of the signals in which a defective component has been compensated for in a received OFDM symbol within the FFT window. As illustrated in FIG. 6H, it is possible to compensate for defective symbols within the FFT window due to a delay larger than the CP length arising, by adding the cyclic-shifted extended CP replica signals to the paths $P_2$ and $P_3$. That is to say, in FIG. 6H, a defective symbol is compensated for in the path $P_2$ during the timing period from $t_0$ to $t_2$—the CP length. In the same manner, in FIG. 6H, a defective symbol is compensated for in the path $P_3$ during the timing period from $t0$ to $t_3$—the CP length.

Although it has been described as an example that the channel convolution multiplying unit 202 in the extended CP replica generating unit 112 described in FIG. 2 is configured to multiply a CP interval-outside channel estimation value by the entire interval of an OFDM symbol replica with its end eliminated, only a signal interval after extended CP replica selection required for each path may be multiplied by the CP interval-outside channel estimation value.

That is to say, the signal after extended CP replica selection illustrated in FIG. 6F may directly be obtained without selecting the extended CP replica by convolution-multiplying a part of an OFDM symbol replica with its end eliminated illustrated in FIG. 3 and the CP interval-outside channel estimation value illustrated in FIG. 6D together. In this case, the output of the channel convolution multiplying unit 202 is output to the extended CP replica shift unit 204, and the extended CP replica shift unit 204 receives a signal with an extended CP replica selected from the channel convolution multiplying unit 202 and shifts the signal to the head within the FFT window. This makes it possible to suppress the number of multiplications in the channel convolution multiplying unit to the minimum, as compared to a case in which the entire interval of an OFDM symbol replica with its end eliminated is convolution-multiplied.

As described above, the receiver in accordance with the first exemplary embodiment of the present invention generates an extended CP replica as a signal corresponding to a defective component of an self-OFDM symbol within an FFT window through the multipath and adds the extended CP replica to a received signal, which makes a communication path matrix a circulant matrix and makes it possible to reduce ISI and ICI that occur after FFT under an environment where a spread of delay of the communication path exceeds a CP length. The receiver in accordance with the first exemplary embodiment of the present invention can reduce the number of complex multiplications in ICI reduction processing and reduce an influence of the characteristic degradation due to a quantization bit limitation of digital signal processing.

Specifically, the receiver in accordance with the first exemplary embodiment of the present invention generates an extended CP replica in a time domain in order to reduce ICI and adds the generated replica to a received signal, which makes a communication path matrix a circulant matrix. This makes it possible to reduce the number of complex multiplications without requiring matrix multiplication with a large number of matrices in ICI reduction processing. If a path number of CP interval-outside channel estimation values is represented by L, and if a sample number of signals after extended CP replica selection through a path I is represented by as Ni (Ni≤N), an estimate of the number of complex multiplications required for the ICI reduction processing in the receiver of the first exemplary embodiment of the present invention is expressed in formula (2). The estimate of the number of complex multiplications required for the ICI reduction processing expressed in formula (2) is smaller as compared to formula (1) expressing an estimate of the number of complex multiplications required for the ICI reduction processing in NPL 1.

$$O\left(N\log_2 N + \sum_{i=0}^{L-i} N_i\right) \quad (2)$$

It is necessary for the receiver disclosed in NPL 1 to process a leaking-in signal of a subcarrier having large amplitude variations on a frequency axis in the ICI reduction processing. In contrast, since the receiver in accordance with the first exemplary embodiment of the present invention processes an OFDM symbol signal on a time axis in the ICI reduction processing, the signal dynamic range is small. This makes it possible to reduce the influence of the characteristic degradation due to a quantization bit limitation of digital signal processing.

A Second Exemplary Embodiment of the Present Invention

Figure 7:
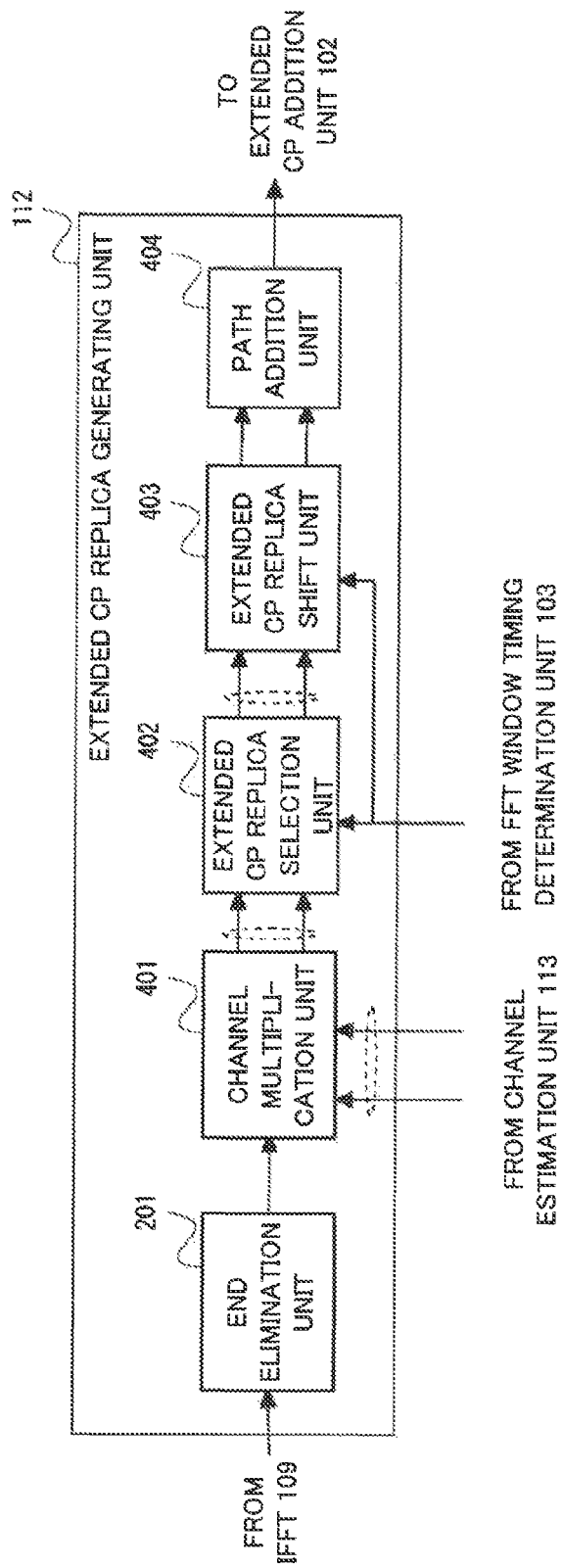
FIG. 7 is a block diagram illustrating a configuration of an extended CP replica generating unit in accordance with a second exemplary embodiment of the present invention.

A second exemplary embodiment of the present invention is based on the first exemplary embodiment of the present invention, and is an embodiment in which the extended CP replica can be generated even though a path head timing, indicating a head of an OFDM symbol before adding CP, is located earlier than an FFT window timing. Specifically, a receiver of the second exemplary embodiment of the present invention differs from that of the first exemplary embodiment as to the processing in the FFT window timing determination unit 103 and the extended CP replica generating unit 112. FIG. 7 is a block diagram illustrating a configuration of an extended CP replica generating unit in accordance with the second exemplary embodiment of the present invention. In FIG. 7, the extended CP replica generating unit 112 includes an end elimination unit 201, a channel multiplication unit 401, an extended CP replica selection unit 402, an extended CP replica shift unit 403, and a path addition unit 404.

The end elimination unit 201 eliminates an end interval corresponding to a CP length in the OFDM symbol replica output from the IFFT 109 in FIG. 1. The end elimination unit 201 outputs the OFDM symbol replica with the end interval eliminated to the channel multiplication unit 401. The elimination of the end interval is performed as is the case with the processing of the first exemplary embodiment of the present invention illustrated in FIG. 3.

The channel multiplication unit 401 multiplies, for each path, the OFDM symbol replica with the end interval eliminated in the end elimination unit 201 by a CP interval-outside channel estimation value output from the CP interval-outside selection unit 111. The channel multiplication unit 401 outputs a signal after the multiplication to the extended CP replica selection unit 402.

In the second exemplary embodiment of the present invention, the FFT window timing determination unit 103 in FIG. 1 measures, in addition to an FFT window timing, a path head timing indicating an OFDM symbol head before adding CP and outputs these timings to the extended CP replica selection unit 402. The path head timing can be obtained by cross-correlation processing of a received signal and a known reference signal replica, for example.

The extended CP replica selection unit 402 selects, based on the FFT window timing and the path head timing, a signal after the CP interval-outside channel estimation value multiplication for each path output from the channel multiplication unit 401. Specifically, the extended CP replica selection unit 402 selects an interval-inside signal of the FFT window and outputs the selected signal to the extended CP replica shift unit 403 from among signals after the CP interval-outside channel estimation value multiplication for each path, with respect to a path having a path head timing positioned earlier than the FFT window timing.

On the other hand, with respect to a path having a path head timing positioned later than the FFT window timing, the extended CP replica selection unit 402 selects an interval-outside signal of the FFT window from among signals after the CP interval-outside channel estimation value multiplication for each path and outputs the selected signal to the extended CP replica shift unit 403, as is the case with the first exemplary embodiment of the present invention.

The extended CP replica shift unit 403 shifts, to a head within the FFT window, only a replica of a path with a path head timing positioned later than the FFT window timing included in the signals after the extended CP replica selection for each path selected in the extended CP replica selection unit 402. The extended CP replica shift unit 403 outputs a shifted replica and an unshifted replica to the path addition unit 404.

The path addition unit 404 adds an extended CP replica signal for each path output from the extended CP replica shift unit 403 between the paths and generates an extended CP replica. The path addition unit 404 outputs the generated extended CP replica to the extended CP addition unit 102.

Next, using FIG. 8A to FIG. 8H, the signal processing of the second exemplary embodiment will be described. FIG. 8A to FIG. 8I are schematic diagrams illustrating a series of processing details to generate an extended CP replica from an OFDM symbol replica in the second exemplary embodiment of the present invention by the CP interval-outside selection unit 111 and the extended CP replica generating unit 112 of the receiver described in FIG. 1. FIG. 8A to FIG. 8I illustrate images of signal processing results in a case where a path head timing indicating a head of an OFDM symbol before CP addition is located earlier than an FFT window timing.

FIG. 8A is a schematic diagram illustrating an example of the signals received through multipath. FIG. 8B is a schematic diagram illustrating an example of OFDM symbols of the signals received through the multipath. FIG. 8C is a schematic diagram illustrating an example of channel estimation values of the signals received through the multipath.

Figure 8E:
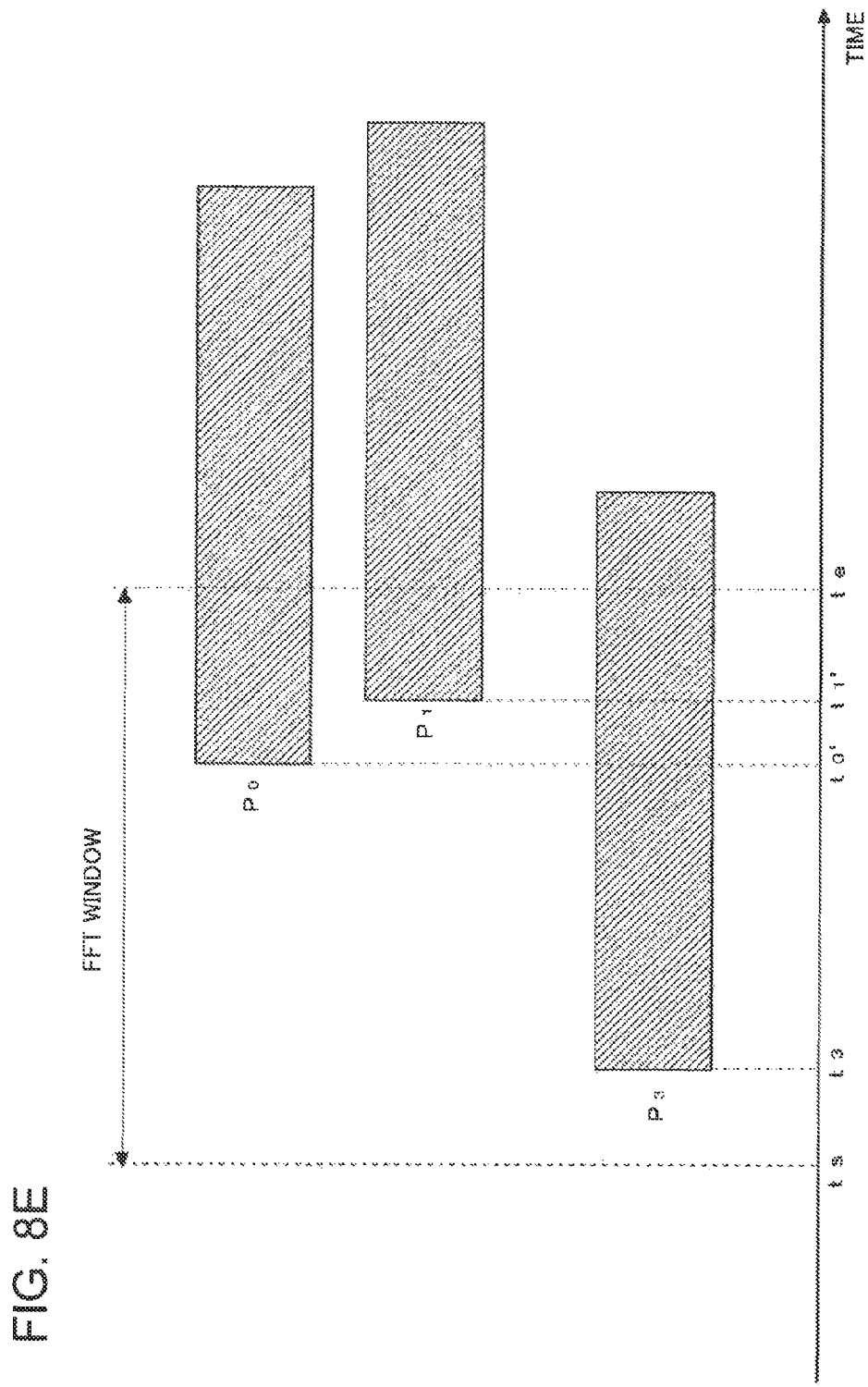
FIG. 8E is a schematic diagram illustrating an example of signals after being subjected to convolution multiplication by a channel multiplication unit 401 in the second exemplary embodiment of the present invention.
Figure 8H:
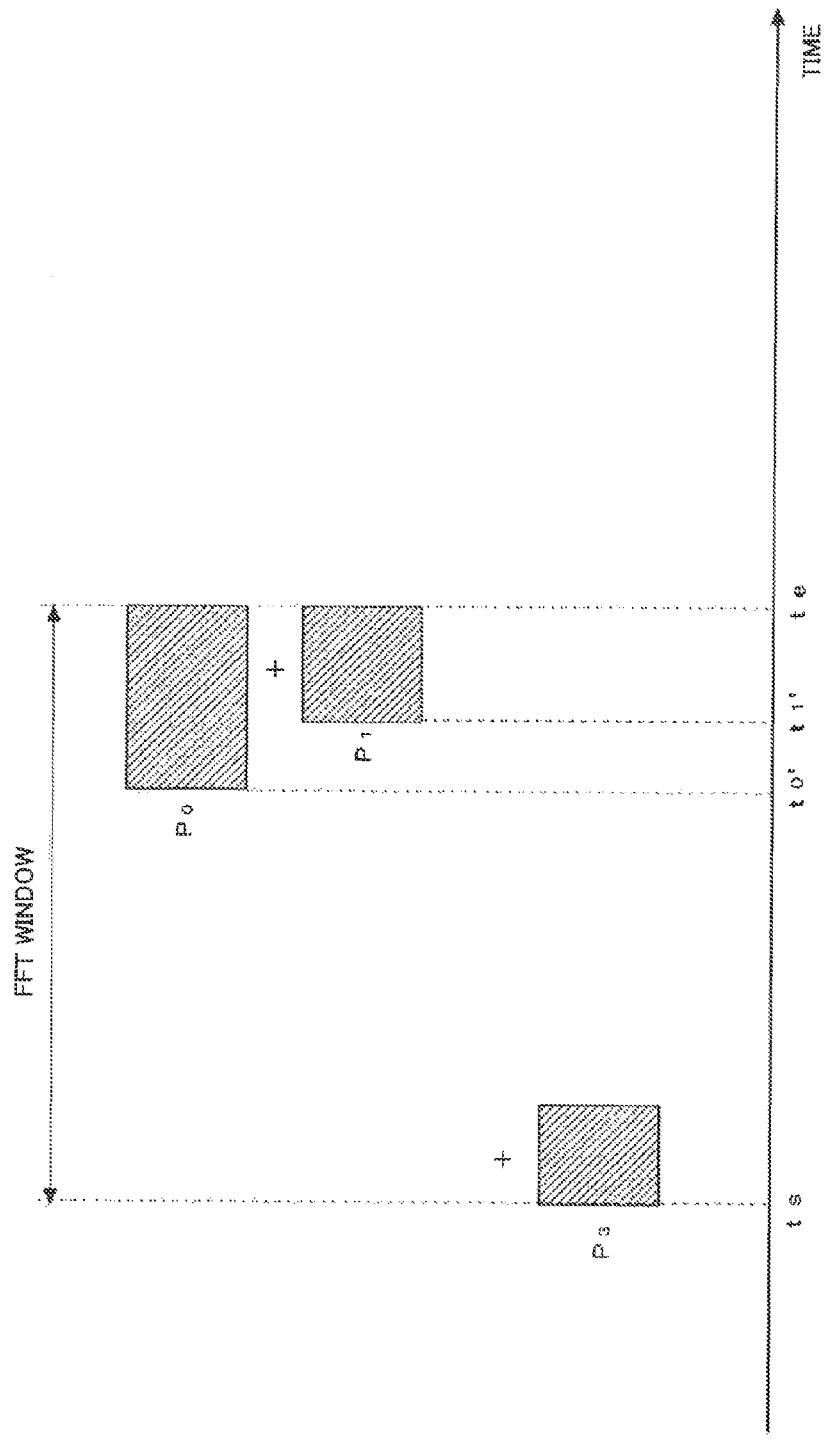
FIG. 8H is a diagram illustrating an example of signals to which respective path components are added in the second exemplary embodiment of the present invention.
Figure 81:
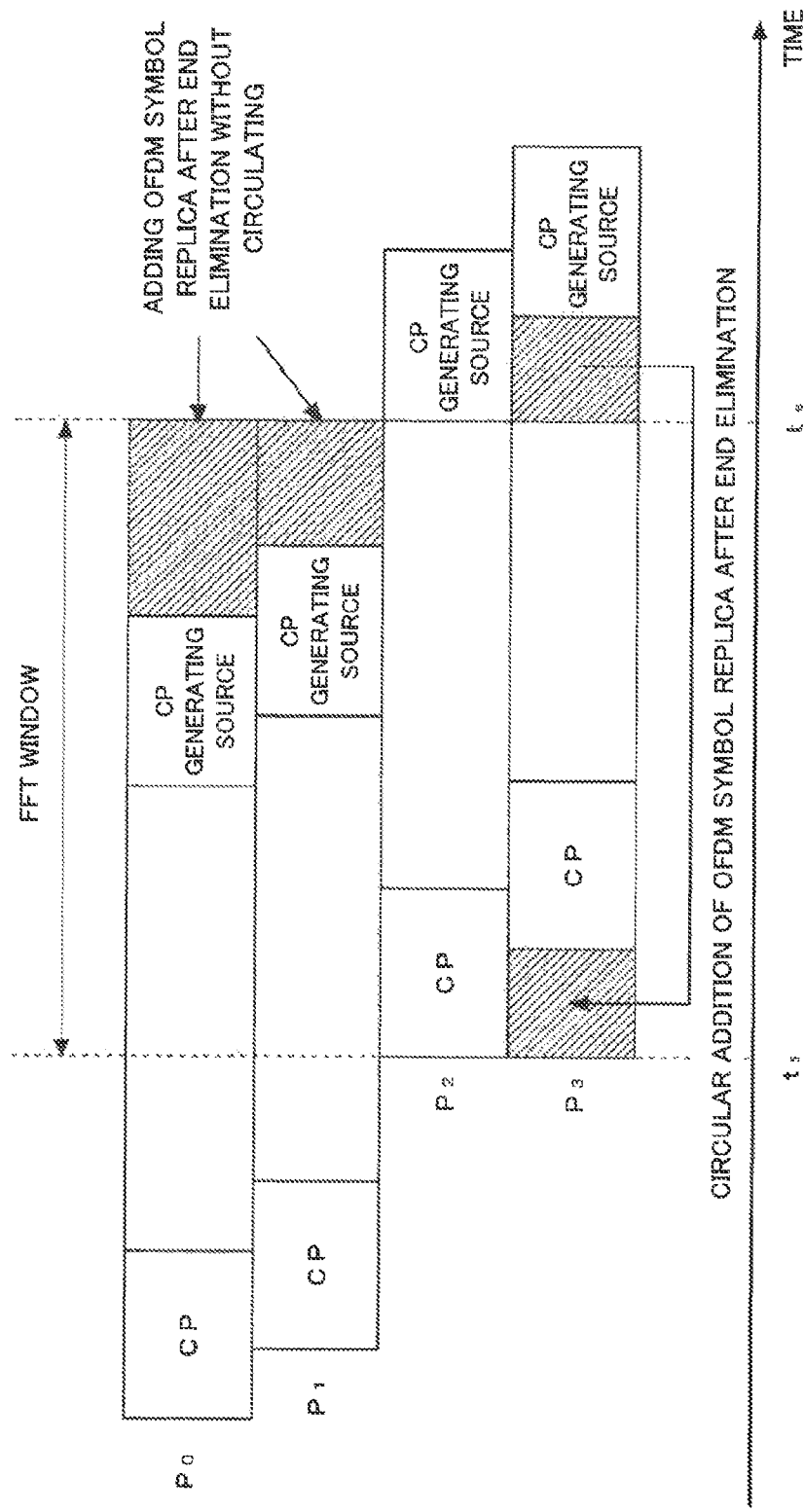

FIG. 8D is a schematic diagram illustrating an example of CP interval-outside channel estimation values selected by the CP interval-outside selection unit 111. FIG. 8E is a schematic diagram illustrating an example of the signals multiplied by the channel multiplication unit 401. FIG. 8F is a schematic diagram illustrating an example of the signals selected as extended CP replicas. FIG. 8H is a schematic diagram illustrating an example of a signal shifted by the extended CP replica shift unit 403. FIG. 8G is a diagram illustrating an example of the signals to which respective path components are added. FIG. 8I is a diagram illustrating an example of the signals obtained by compensating for defective components in received OFDM symbols within an FFT window. Each signal is expressed as a timing at a head of a CP of each path and a gain.

In FIG. 8A, paths $P_0$, $P_1$, $P_2$, and $P_3$ represent signals that are received at different timings due to delay differences resulting from different communication paths. In FIG. 6A, the vertical axis represents a gain and the horizontal axis represents a time difference of the signals received through each path. Each path is expressed as a timing at a head of each CP and a gain.

FIG. 8B illustrates the relation between received OFDM symbols having passed through a multipath communication line composed of the paths $P_0$, $P_1$, $P_2$, and $P_3$ and path head timings of the respective paths. In FIG. 8A to FIG. 8H, the horizontal axis represents a time difference of the signals received through each path. In FIG. 8A to FIG. 8H, a reference $t_0$ represents a timing of the head of a symbol through the path $P_0$. In addition, $t_1$ represents a timing of the head of a symbol through the path $P_1$, $t_2$ represents a timing of the head of a symbol through the path $P_2$, and $t_3$ represents a timing of the head of a symbol through the path $P_3$. Further, $t_s$ represents the head timing of the symbol including a CP through the path $P_2$. Further, $t_e$ represents a timing of the tail end of the symbol except a CP generating source through the path $P_2$. Here, $t_s$ represents the head of the FFT window, and $t_e$ represents the end of the FFT window.

The channel estimation unit 113 performs channel estimation on each path illustrated in FIG. 8B and outputs a channel estimation value illustrated in FIG. 8C.

The CP interval-outside selection unit 111 selects channel estimation values composed of the paths $P_3$, $P_0$, and $P_1$ departing from the CP interval of the head of the FFT window from among channel estimation values of the paths $P_0$, $P_1$, $P_2$, and $P_3$ in FIG. 8C. FIG. 8D illustrates an example of the selected CP interval-outside channel estimation values. In FIG. 8C and FIG. 8D, the CP interval is an interval having a CP length from the head timing of the FFT window. Since the paths $P_0$ and $P_1$ of the channel estimation values have the path head timings positioned ahead of the FFT window timing, they are observed in FIG. 8C behind the path $P_3$ as loop-back components within the FFT window. The channel estimation values of the path P0 and P1 are observed at the positions of t0' and t1'.

The channel multiplication unit 401 convolution-multiplies an OFDM symbol replica with the end corresponding to the CP length eliminated and a CP interval-outside channel estimation value together, and generates a signal after the CP interval-outside channel estimation value convolution-multiplication. By multiplying the OFDM symbol replica by the CP interval-outside channel estimation value, a symbol replica is generated that corresponds to a signal of a path received with a delay later than the CP length from the head timing of the FFT window. FIG. 8E is a diagram illustrating signals obtained by convolution-multiplying the OFDM symbol replica by the CP interval-outside channel estimation value, that is, signals after CP interval-outside channel estimation value convolution multiplication.

In the first exemplary embodiment, a portion is compensated for that cannot be compensated for by a CP due to a delay, in the OFDM symbols of signals received through multipath, whereas in the second exemplary embodiment, in addition, a defective portion in a Fourier transform window is also compensated for in a path in which a head of a symbol is positioned at a timing ahead of the Fourier transform window.

The extended CP replica selection unit 402 selects only a component within the FFT window interval, for a path in which a path head timing is positioned ahead of the FFT window timing, from among signals after CP interval-outside channel estimation value multiplication, selects only an interval-outside component of the FFT window for a path in which a path head timing is positioned behind the FFT window timing, and generates a signal after extended CP replica selection. FIG. 8F is a diagram illustrating an example of signals after the selection.

The extended CP replica shift unit 403 shifts an interval-outside component behind the FFT window to the head within the FFT window.

The path addition unit 404 adds each path component after the shift. FIG. 8G is a diagram illustrating an example of signals to which each path component is added.

The extended CP addition unit 102 adds a cyclic-shifted extended CP replica to a received OFDM symbol. The results of the addition are illustrated in FIG. 8H.

FIG. 8I is a diagram illustrating an example of the signals obtained by compensating for defective components in the received OFDM symbols within the FFT window. As illustrated in FIG. 8I, by adding the extended CP replicas looped-back in the FFT window to the paths $P_0$ and $P_1$, and a cyclic-shifted extended CP replica to the path $P_3$, it is possible to compensate for a defective symbol within the FFT window due to a delay larger than the CP length arising. That is to say, in FIG. 8I, in the path $P_0$, symbols lost in a timing period from $t_0'$ to $t_e$ are compensated for. In the same manner, in FIG. 8I, in the path $P_1$, symbols lost in a timing period from $t_1'$ to $t_e$ are compensated for. Further, in FIG. 8I, in the path $P_3$, symbols lost in a timing period from $t_s$ to $t_3$—the CP length are compensated for.

Although the configuration has been described as an example in which the channel multiplication unit 401 multiplies the entire interval of an OFDM symbol replica with its end eliminated and a CP interval-outside channel estimation value together, only a signal interval after the extended CP replica selection required for each path may be multiplied by a CP interval-outside channel estimation value, as is the case with the first exemplary embodiment.

That is to say, the signal after extended CP replica selection illustrated in FIG. 8F may directly be obtained without selecting the extended CP replica by multiplying a part of the OFDM symbol replica with its end eliminated illustrated in FIG. 3 and the CP interval-outside channel estimation value illustrated in FIG. 8D together.

In this case, the output of the channel multiplication unit 401 is output to the extended CP replica shift unit 403. The extended CP replica shift unit 403 performs shift processing on the signal with the extended CP replica selected. These processes make it possible to suppress the number of multiplications in the channel multiplication unit to the minimum, as compared to a case in which the entire interval of an OFDM symbol replica with its end eliminated is multiplied.

As described above, it is possible in the second exemplary embodiment of the present invention to make a communication path matrix a circulant matrix and reduce the ICI after FFT by compensating for a defective component within the FFT window, even though there is a path in which a path head timing is positioned ahead of the FFT window.

A Third Exemplary Embodiment of the Present Invention

A third exemplary embodiment of the present invention will be described citing as an example a case in which the present exemplary embodiment is applied to a receiver for DFT-Spread OFDM and residual multi-path interference (MPI) is eliminated with eliminating the ISI and adding the extended CP. Hereinafter, in the description of the third exemplary embodiment of the present invention, only differences with the first exemplary embodiment of the present invention will be described.

Figure 9:
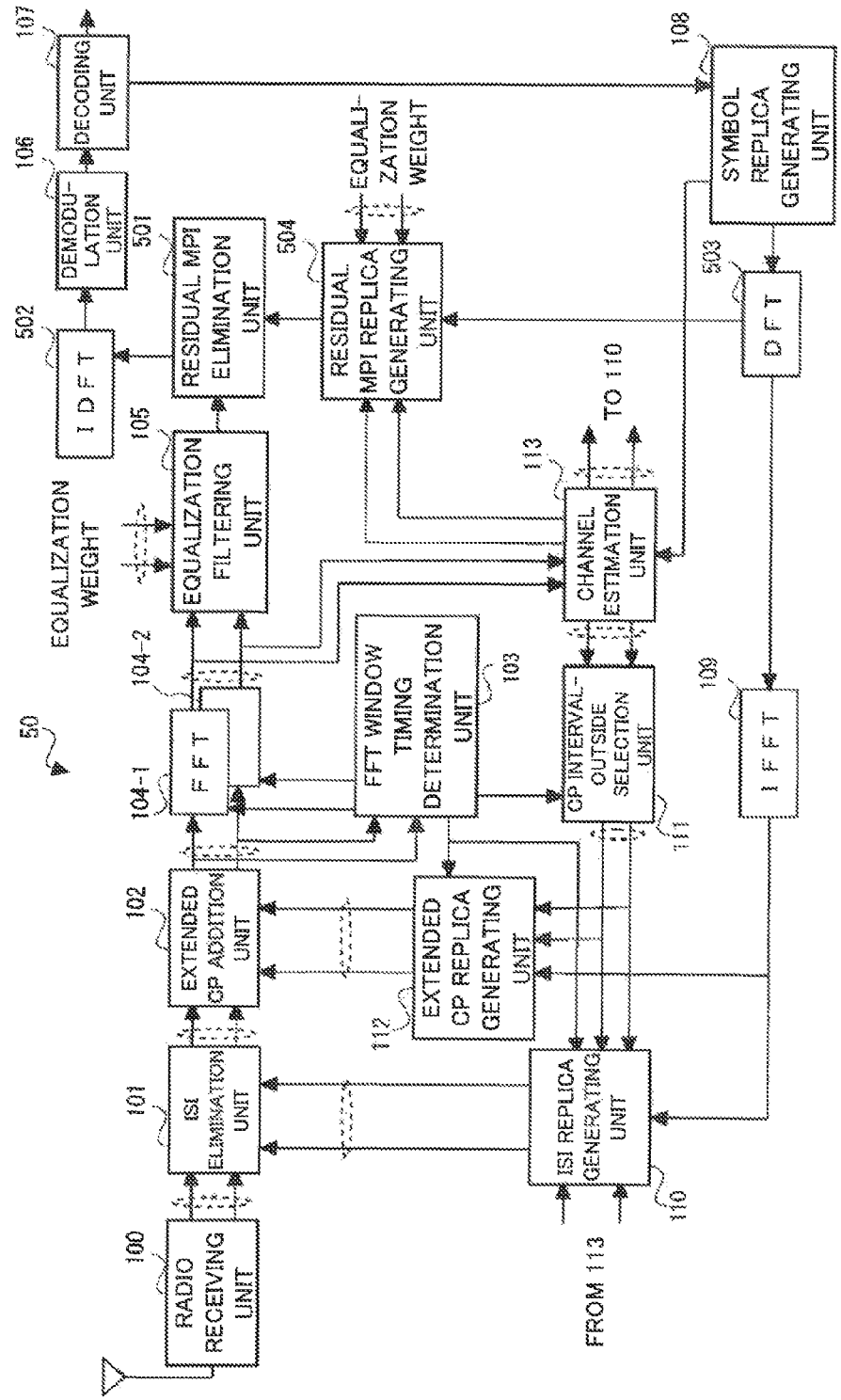
FIG. 9 is a block diagram illustrating a configuration of a receiver in accordance with a third exemplary embodiment of the present invention.
Figure 10:
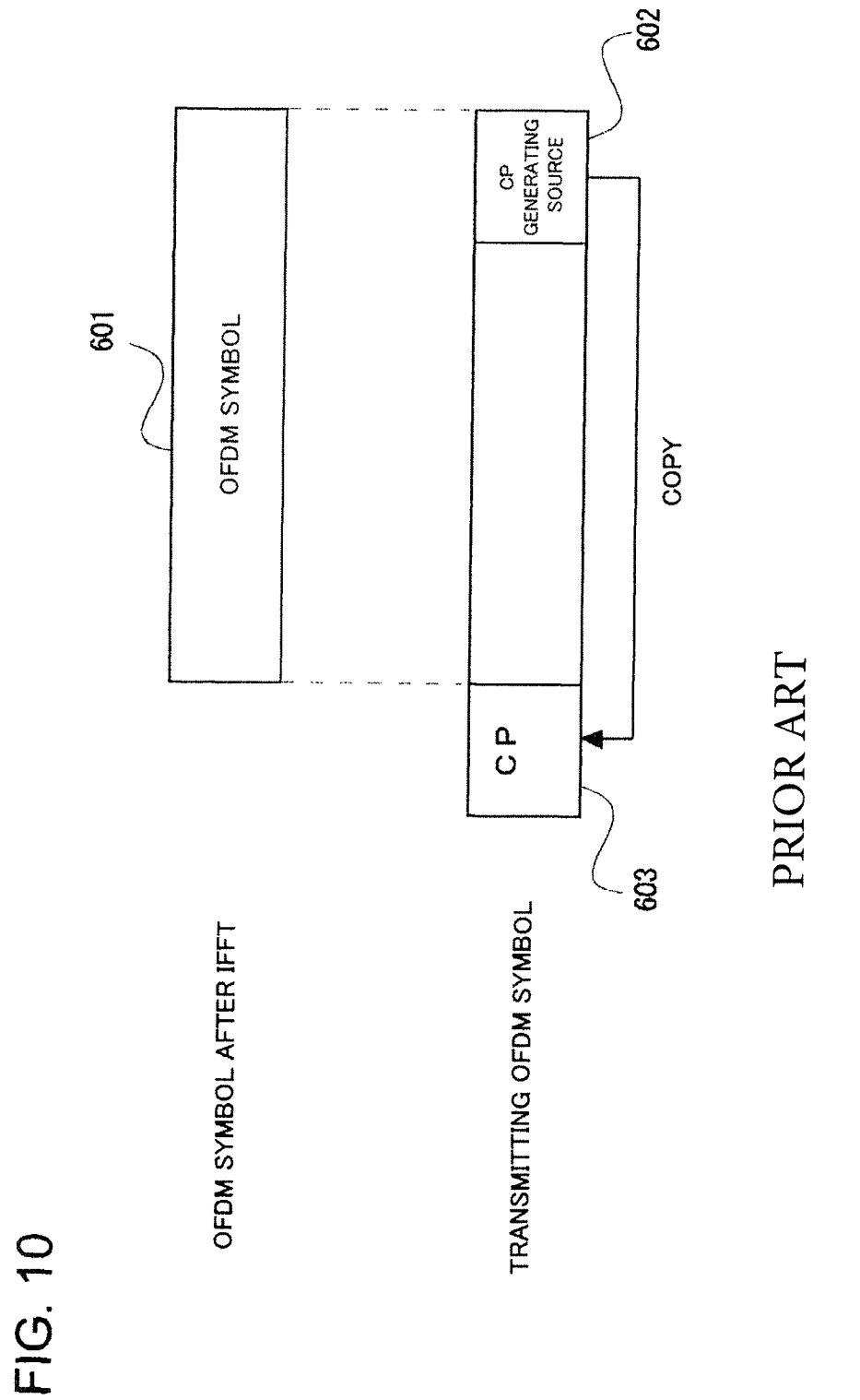
FIG. 10 is a schematic diagram illustrating CP addition processing in a transmission side.
Figure 11:
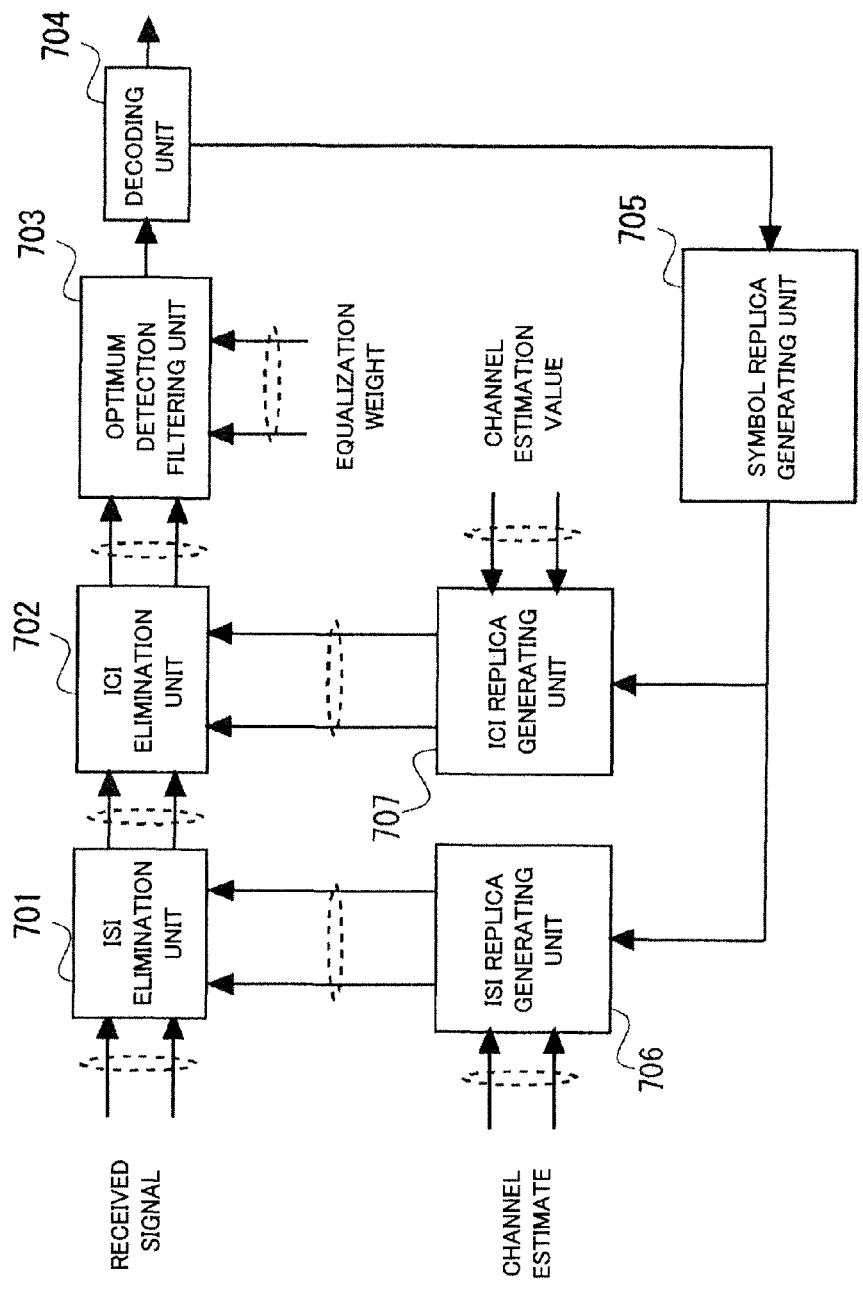
FIG. 11 is a diagram illustrating an example of a conventional receiver.

FIG. 9 is a block diagram illustrating a configuration of a receiver in accordance with the third exemplary embodiment of the present invention. In the third exemplary embodiment of the present invention, the demodulation is performed decreasing the impacts of ISI, ICI, and residual MPI under an environment where a spread of delay of a multipath communication line exceeds a CP length. The third exemplary embodiment of the present invention will be described citing as an example a case in which DFT-Spread OFDM is used as a transmission system and two receiving antennas are used.

A receiver 50 in accordance with the third exemplary embodiment of the present invention includes, in addition to the configurations described in FIG. 1, a residual MPI elimination unit 501, an IDFT 502, a DFT 503, and a residual MPI replica generating unit 504. The configurations with the exception of the residual MPI elimination unit 501, the IDFT 502, the DFT 503, and the residual MPI replica generating unit 504 are the same as those in the first or the second exemplary embodiment of the present invention.

An equalization filtering unit 105 equalizes signals by causing synthesis of the signals after the FFT for each receiving antenna according to an equalization weight. The equalization filtering unit 105 outputs the signals after the equalization to the residual MPI elimination unit 501. It is favorable for DFT-Spread OFDM to use a minimum mean squared error (MMSE) weight as the equalization weight.

The residual MPI elimination unit 501 subtracts a residual MPI replica from the signal after the equalization and eliminates residual MPI from the signal after the equalization. The residual MPI elimination unit 501 outputs a signal after the subtraction to the IDFT 502.

The residual MPI means an MPI component passing through the equalization filtering unit 105 with the MPI not completely suppressed. The modulation symbol in the OFDM transmission system is mapped on a subcarrier. Consequently, a subcarrier interval is small relative to the frequency selectivity of a communication path, so that the influence of the residual MPI is negligible. In contrast, in the DFT-Spread OFDM transmission system, the modulation symbols are mapped across a plurality of subcarriers, so that the residual MPI arises in a signal after equalization filtering under the influence of the frequency selectivity of a communication path.

The IDFT 502 performs IDFT processing on a signal after equalization with the residual MPI eliminated. The IDFT 502 outputs an IDFT-processed signal to the demodulation unit 106.

The demodulation unit 106 converts the IDFT-processed signal into soft decision information for each bit. The demodulation unit 106 outputs the soft decision information to the decoding unit 107.

The symbol replica generating unit 108 converts soft decision information after the decoding into a soft symbol replica. The symbol replica generating unit 108 outputs the symbol replica to the DFT 503.

The DFT 503 performs DFT processing on the symbol replica and performs subcarrier mapping. The DFT 503 outputs the DFT-processed symbol replica to the IFFT 109 and the residual MPI replica generating unit 504.

The residual MPI replica generating unit 504 generates a channel estimation value after equalization using a channel estimation value output from the channel estimation unit 103 and an equalization weight, and further generates a replica corresponding to a residual component of the MPI that is not suppressed in the equalization filtering unit 105 using the channel estimation value after equalization and the symbol replica. The residual MPI replica generating unit 504 outputs the generated replica to the residual MPI elimination unit 501. As a method for generating the residual MPI replica, any of various types of methods described in prior art documents is applicable.

The IFFT 109 performs IFFT processing on the soft symbol replica and generates an OFDM symbol replica. The OFDM symbol replica is output to the ISI replica generating unit 110 and the extended CP replica generating unit 112.

As described above, according to the third exemplary embodiment of the present invention, in the receiver for DFT-Spread OFDM, it is possible to reduce ISI and ICI that arise under an environment where a spread of delay of the communication path exceeds a CP length. In addition, it is possible to eliminate the residual MPI that cannot be eliminated by equalization filters.

Although the generation accuracy of the ISI replica and the extended CP replica is generally reduced due to the influence of the residual MPI, applying the residual MPI elimination according to the third exemplary embodiment of the present invention enables the generation accuracy of the ISI replica and the extended CP replica to improve. The improvement of the generation accuracy of the ISI replica and the extended CP replica also enables the generation accuracy of the residual MPI replica to improve.

As mentioned above, the receiver according to the third exemplary embodiment of the present invention performs repetition processing for interference cancellation, by which the receiver can eliminate ISI, ICI, and the residual MPI mutually, and can obtain excellent reception characteristics with a small repeat count.

Although the first to third exemplary embodiments of the present invention has been described using the configuration, as an example, in which the extended CP addition unit 102 is disposed in a stage following the ISI elimination unit 101, the extended CP addition unit 102 may be disposed in a stage preceding the ISI elimination unit 101.

Although the first to third exemplary embodiments of the present invention has been described using the receiver, as an example, which is assumed to have a single transmission antenna, those exemplary embodiments are also applicable to an example of a receiver assumed to have two or more transmission antennas.

Any of the receivers according to the first to third exemplary embodiments of the present invention is applicable to a base station apparatus, a communication terminal device, a radio relaying apparatus, and a radio router.

Although the examples of the OFDM transmission system have been described in the above description, the exemplary embodiments are applicable to any system as long as it is a multipath transmission system using a cyclic prefix. The exemplary embodiments may be applied to a single-carrier radio communication system using a cyclic prefix, particularly to a single carrier frequency division multiplexing system, for example.

Each configuration of the receiver according to the present invention can be implemented by software or hardware such as an application specific integrated circuit (ASIC). A part of the processing may be implemented by software, and the other part may be implemented by hardware. When the processing is implemented by software, a computer system including one or a plurality of central processing units (CPUs) such as a microprocessor is made to execute the programs to process functional blocks. These programs are stored using various types of non-transitory computer readable media and can be supplied to a computer. The non-transitory computer readable media include various types of tangible storage media. The examples of the non-transitory computer readable medium include a magnetic recording medium (e.g. a flexible disk, a magnetic tape, and a hard disk drive), a magneto-optical recording medium (e.g. a magneto-optical disk), a CD-ROM (Compact Disc Read Only Memory), a CD-R, a CD-R/W, a DVD-ROM (Digital Versatile Disc Read Only Memory), a DVD-R (DVD Recordable), a DVD-R DL (DVD-R Dual Layer), a DVD-RW (DVD ReWritable), a DVD-RAM, a DVD+R, a DVR+R DL, a DVD+RW, a BD-R (Blu-ray (registered trademark) Disc Recordable), a BD-RE (Blu-ray Disc Rewritable), a BD-ROM, and a semiconductor memory (e.g. a mask ROM, a PROM (Programmable ROM), an EPROM (Erasable PROM), a flash ROM, and a RAM (random access memory). The programs may be supplied to the computer by using various types of transitory computer readable media. The examples of the transitory computer readable medium include electrical signals, optical signals, and electromagnetic waves. The transitory computer readable medium can supply the programs to the computer through a wired communication path such as an electrical wire and an optical fiber, or a wireless communication path.

INDUSTRIAL APPLICABILITY

The present invention is favorably applicable to any of the receivers and methods for the OFDM-based transmission system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-134112, filed on Jun. 30, 2014, the disclosure of which is incorporated herein in its entirety by reference.

REFERENCE SIGNS LIST

100 Radio receiving unit
101 ISI elimination unit
102 Extended CP addition unit
103 FFT window timing determination unit
104-1, 104-2 FFT
105 Equalization filtering unit
106 Demodulation unit
107 Decoding unit
108 Symbol replica generating unit
109 IFFT
110 ISI replica generating unit
111 CP interval-outside channel estimation value selection unit
112 Extended CP replica generating unit
113 Channel estimation unit
201 OFDM symbol replica end elimination unit
202 Channel convolution multiplying unit
203 Extended CP replica selection unit
204 Extended CP replica shift unit
301 OFDM symbol replica after IFFT
302 OFDM symbol replica after end elimination
401 Channel multiplication unit
402 Extended CP replica selection unit
403 Extended CP replica shift unit
404 Path addition unit
501 Residual MPI elimination unit
502 IDFT
503 DFT
504 Residual MPI replica generating unit

The invention claimed is:

1. A receiver, comprising:
an addition unit configured to compensate for a symbol lost within a Fourier transform window to received signals received through a plurality of paths;
a Fourier transform unit configured to perform, in a range of the Fourier transform window, Fourier transform on a received signal with a lost symbol added in the addition unit; and
a CP interval-outside selection unit configured to select, from among channel estimation values of the received signals received through the plurality of paths, a channel estimation value with a timing delay equal to or large than a cyclic prefix length from a head timing of the Fourier transform window; and
an extended CP replica generation unit configured to generate a replica from a symbol replica of the received signal and the channel estimation value selected by the CP interval-outside selection unit, and cyclic-shift the replica within the Fourier transform window,
wherein the addition unit adds the replica generated and cyclic-shifted in the CP replica generation unit to the received signal, and
the Fourier transform unit performs Fourier transform on the received signal with the replica added within the range of the Fourier transform window.

2. The receiver according to claim 1,
wherein the extended CP replica generation unit includes
an end elimination unit configured to eliminate a CP length portion from an end of the symbol replica,
a convolution multiplication unit configured to convolution-multiply the channel estimation value selected in the CP interval-outside selection unit and the symbol replica with its end eliminated together,
an extended CP replica selection unit configured to select a portion of an interval-outside signal of the Fourier transform window from among a signal obtained in the convolution multiplication unit, and
an extended CP replica shift unit configured to shift a signal of the portion selected in the extended CP replica selection unit to a head timing of the Fourier transform window, wherein the addition unit adds a signal shifted in the extended CP replica shift unit to the received signal.

3. The receiver according to claim 2, further comprising an equalization filtering unit configured to perform channel equalization on a received signal subjected to Fourier transform in the Fourier transform unit,
a demodulation unit configured to perform soft decision on a received signal subjected to the channel equalization for each bit and obtain soft decision information,
a decoding unit configured to perform error correction decoding on the soft decision information,
a symbol replica generation unit configured to generate a symbol replica from soft decision information after being decoded, and
an inverse Fourier transform unit configured to perform inverse Fourier transform on the symbol replica,
wherein the end elimination unit eliminates a CP length portion from an end of the symbol replica subjected to inverse Fourier transform.

4. The receiver according to claim 1, further comprising a window timing determination unit configured to determine a timing of the Fourier transform window to preform Fourier transform on the received signal,
wherein the extended CP replica generation unit includes an end elimination unit configured to eliminate a CP length portion from an end of the symbol replica,
a multiplication unit configured to multiply a channel estimation value selected in the CP interval-outside selection unit and the symbol replica with its end eliminated together in channel path unit,
an extended CP replica selection unit configured to compare a head timing of a path of a symbol of a received signal with a cyclic prefix eliminated and a timing of the Fourier transform window,
select a signal in the Fourier transform window from among a signal after multiplication output from the multiplication unit for a channel path in which a head timing of the path being positioned ahead of the timing of the Fourier transform window, and
select an interval-outside signal of the Fourier transform window from among a signal after multiplication output from the multiplication unit for a channel path in which a head timing of the path being positioned behind the timing of the Fourier transform window,
an extended CP replica shift unit configured to shift only a selected signal of a channel path in which a head timing of the path being positioned behind the timing of the Fourier transform window to a head timing within the Fourier transform window, for a signal selected for each channel path output from the extended CP replica selection unit,
a path addition unit configured to add a signal after extended CP replica shift for each channel path output from the extended CP replica shift unit in the channel path, the extended CP replica selection unit configured to select a portion of an interval-outside signal of the Fourier transform window from among a signal obtained in the multiplication unit;
the extended CP replica shift unit configured to shift a signal of the portion selected in the extended CP replica selection unit to a head timing of the Fourier transform window; and
the path addition unit configured to add a signal shifted in the extended CP replica shift unit in channel path unit,
wherein the addition unit adds a signal added in the path addition unit to the received signal, and the Fourier transform unit performs Fourier transform on the received signal after the addition in the range of the Fourier transform window.

5. The receiver according to claim 4,
wherein the multiplication unit multiplies a channel estimation value of an interval-outside signal of the Fourier transform window and a part of one or more OFDM symbol replicas after end elimination in same interval or different intervals for each channel path, and
the extended CP replica shift unit shifts a signal obtained in the multiplication unit to a head position within the Fourier transform window in a channel path in which a head timing of the path is positioned behind a timing of the Fourier transform window.

6. The receiver according to claim 1, further comprising an equalization filtering unit configured to perform channel equalization on a signal subjected to Fourier transform in the Fourier transform unit,
a residual multipath interference replica generation unit configured to generate a replica of a residual multipath interference component,
a residual multipath interference elimination unit configured to eliminate a residual multipath interference component from a signal subjected to the channel equalization using the replica of the residual multipath interference component,
an inverse Fourier transform unit configured to perform inverse Fourier transform on a signal equalized after the residual multipath interference elimination,
a demodulation unit configured to convert a signal after the inverse Fourier transform into soft decision information in bit unit,
a decoding unit configured to perform error correction decoding on the soft decision information,
a symbol replica generation unit configured to generate a symbol replica using soft decision information subjected to the error correction decoding, and
a second Fourier transform unit configured to perform Fourier transform on the symbol replica,
wherein the residual multipath interference replica generation unit generates a replica of the residual multipath interference component using a signal obtained by performing Fourier transform on a symbol replica.

7. A receiving method, comprising:
compensating for a symbol lost within a Fourier transform window to received signals received through a plurality of paths; and
performing, in a range of the Fourier transform window, Fourier transform on a received signal with a lost symbol added in the compensating for the symbol lost; and
selecting, from among channel estimation values of the received signals received through the plurality of paths, a channel estimation value with a timing delay equal to or large than a cyclic prefix length from a head timing of the Fourier transform window;
generating a replica from a symbol replica of the received signal and the channel estimation value and cyclic-shifting the replica within the Fourier transform window;
adding the replica generated and cyclic-shifted to the received signal; and
performing Fourier transform on the received signal with the replica added within the range of the Fourier transform window.

8. A non-transitory computer readable medium storing a receiving program, the receiving program comprising:

an adding step for compensating for a symbol lost within a Fourier transform window to received signals received through a plurality of paths; and a Fourier transform step for performing, in a range of the Fourier transform window, Fourier transform on a received signal with a lost symbol added in the adding step, and outputting a signal after transform; and a selecting step for selecting, from among channel estimation values of the received signals received through the plurality of paths, a channel estimation value with a timing delay equal to or large than a cyclic prefix length from a head timing of the Fourier transform window;

a generating step for generating a replica from a symbol replica of the received signal and the channel estimation value and cyclic-shifting the replica within the Fourier transform window;

the adding step for adding the replica generated and cyclic-shifted to the received signal; and the Fourier transform step for performing Fourier transform on the received signal with the replica added within the range of the Fourier transform window.

\* \* \* \* \*